United States Patent
Huang et al.

(10) Patent No.: US 12,532,322 B2
(45) Date of Patent: Jan. 20, 2026

(54) SEMI-PERSISTENT SCHEDULING CANCELLATION VIA GROUP COMMON CONTROL INFORMATION

(71) Applicant: QUALCOMM Incorporated, San Diego, CA (US)

(72) Inventors: Yi Huang, San Diego, CA (US); Jing Sun, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1127 days.

(21) Appl. No.: 17/507,699

(22) Filed: Oct. 21, 2021

(65) Prior Publication Data

US 2022/0132477 A1    Apr. 28, 2022

Related U.S. Application Data

(60) Provisional application No. 63/104,464, filed on Oct. 22, 2020.

(51) Int. Cl.
| | |
|---|---|
| *H04W 72/23* | (2023.01) |
| *H04L 1/1607* | (2023.01) |
| *H04L 1/1829* | (2023.01) |
| *H04L 1/1867* | (2023.01) |
| *H04W 24/02* | (2009.01) |
| *H04W 72/0453* | (2023.01) |

(52) U.S. Cl.
CPC ........... *H04W 72/23* (2023.01); *H04L 1/1614* (2013.01); *H04L 1/1864* (2013.01); *H04L 1/1893* (2013.01); *H04W 24/02* (2013.01); *H04W 72/0453* (2013.01)

(58) Field of Classification Search
CPC . H04W 72/23; H04W 24/02; H04W 72/0453; H04L 1/1614; H04L 1/1893; H04L 1/1864

See application file for complete search history.

(56) References Cited

U.S. PATENT DOCUMENTS

| | | | |
|---|---|---|---|
| 2021/0160879 A1* | 5/2021 | Lin | ............ H04W 72/0453 |
| 2021/0282114 A1* | 9/2021 | Liu | ................ H04L 1/1896 |

* cited by examiner

*Primary Examiner* — Omar J Ghowrwal
(74) *Attorney, Agent, or Firm* — QUALCOMM Incorporated

(57) ABSTRACT

A base station may associate multiple user equipment (UEs) with one or more UE groups and generate group common downlink control information (DCI) for each UE group for semi-persistent scheduling (SPS) cancellation, such that group common DCI may be transmitted to UEs of a respective UE group. The base station may associate each of UEs with a respective UE group, wherein the UEs are configured with SPS configurations by the base station, each SPS configuration configuring respective SPS occasions. The base station may further determine to cancel one or more SPS occasions associated with at least one of the SPS configurations, generate one or more group common DCI for the one or more UE groups to cancel the one or more SPS occasions, and transmit the one or more group common DCI to one or more UEs associated with the at least one of the SPS configurations.

30 Claims, 19 Drawing Sheets

SEMI-PERSISTENT SCHEDULING CANCELLATION VIA GROUP COMMON CONTROL INFORMATION

PRIORITY CLAIM

This application claims priority to and the benefit of provisional patent application No. 63/104,464 filed in the United States Patent & Trademark Office on Oct. 22, 2020, the entire content of which is incorporated herein by reference as if fully set forth below in its entirety and for all applicable purposes.

TECHNICAL FIELD

The technology discussed below relates generally to wireless communication systems, and more particularly, to a method and apparatus for cancelling one or more semi-persistent scheduling occasions via group common control information for a group of UEs.

INTRODUCTION

In a wireless communication system, a base station can schedule communication resources for user equipment (UE) using dynamic scheduling or semi-persistent scheduling. Dynamic scheduling is a mechanism in which the base station schedules the downlink (e.g., physical downlink shared channel (PDSCH)) or uplink (e.g., the physical uplink shared channel (PUSCH)) data in each subframe, for example, using downlink control information (DCI). Dynamic scheduling provides the network with flexibility in assigning communication resources to the UE at the cost of increased control signaling overhead to transmit scheduling information for each uplink or downlink transmission.

To reduce communication overhead, the base station can allocate communication resources on a semi-persistent basis. Semi-persistent scheduling (SPS) is a mechanism in which the base station schedules an uplink/downlink transmission using a semi-static control message (e.g., radio resource control (RRC) message). SPS can significantly reduce control signaling overhead because the base station does not need to transmit scheduling information (e.g., grant) for each uplink or downlink communication. In this disclosure, SPS and configured scheduling may be used interchangeably.

SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide a method, system, device, and apparatus for cancelling one or more semi-persistent scheduling occasions via group common downlink control information (DCI) for a group of UEs. A base station may associate multiple UEs with one or more UE groups, generate group common SPS cancellation DCI for each UE group. As such, the base station may transmit the group common SPS cancellation DCI to UEs of a respective UE group, instead of a separate transmission of a separate DCI for each UE.

In one example, a method of wireless communication by a base station is disclosed. The method includes associating each of a plurality of user equipment (UEs) with a respective UE group of one or more UE groups, wherein the plurality of UEs are configured with a plurality of semi-persistent scheduling (SPS) configurations by the base station, each SPS configuration of the plurality of SPS configurations configuring a plurality of respective SPS occasions, determining to cancel one or more SPS occasions associated with at least one of the plurality of SPS configurations, generating one or more group common downlink control information (DCI) for the one or more UE groups to cancel the one or more SPS occasions, and transmitting the one or more group common DCI to one or more UEs associated with the at least one of the plurality of SPS configurations. In an aspect, each of the plurality of UEs is associated with the respective UE group of one or more UE groups based on a locations of a respective UE of the plurality of UEs.

In another example, a base station for wireless communication is disclosed. The base station includes at least one processor, a transceiver communicatively coupled to the at least one processor, and a memory communicatively coupled to the at least one processor. The at least one processor may be configured to associate each of a plurality of user equipment (UEs) with a respective UE group of one or more UE groups, wherein the plurality of UEs are configured with a plurality of semi-persistent scheduling (SPS) configurations by the base station, each SPS configuration of the plurality of SPS configurations configuring a plurality of respective SPS occasions, determine to cancel one or more SPS occasions associated with at least one of the plurality of SPS configurations, generate one or more group common downlink control information (DCI) for the one or more UE groups to cancel the one or more SPS occasions, and transmit the one or more group common DCI to one or more UEs associated with the at least one of the plurality of SPS configurations.

In another example, a non-transitory processor-readable storage medium having instructions for a base station thereon may be disclosed. The instructions, when executed by a processing circuit, cause the processing circuit to associate each of a plurality of user equipment (UEs) with a respective UE group of one or more UE groups, wherein the plurality of UEs are configured with a plurality of semi-persistent scheduling (SPS) configurations by the base station, each SPS configuration of the plurality of SPS configurations configuring a plurality of respective SPS occasions, determine to cancel one or more SPS occasions associated with at least one of the plurality of SPS configurations, generate one or more group common downlink control information (DCI) for the one or more UE groups to cancel the one or more SPS occasions, and transmit the one or more group common DCI to one or more UEs associated with the at least one of the plurality of SPS configurations.

In a further example, a base station for wireless communication may be disclosed. The base station includes means for associating each of a plurality of user equipment (UEs) with a respective UE group of one or more UE groups, wherein the plurality of UEs are configured with a plurality of semi-persistent scheduling (SPS) configurations by the base station, each SPS configuration of the plurality of SPS configurations configuring a plurality of respective SPS occasions, means for determining to cancel one or more SPS occasions associated with at least one of the plurality of SPS configurations, means for generating one or more group common downlink control information (DCI) for the one or more UE groups to cancel the one or more SPS occasions, and means for transmitting the one or more group common DCI to one or more UEs associated with the at least one of the plurality of SPS configurations.

In one example, a method of wireless communication by a user equipment (UE) is disclosed. The method includes configuring to monitor a plurality of semi-persistent scheduling (SPS) occasions based on an SPS configuration, receiving, from a base station, group common downlink control information (DCI) that indicates cancellation of one or more SPS occasions of the plurality of SPS occasions, the group common DCI being associated with a UE group that includes one or more UEs including the UE, and refraining from monitoring the one or more SPS occasions based on the group common DCI to cancel the one or more SPS occasions.

In another example, a UE for wireless communication is disclosed. The UE includes at least one processor, a transceiver communicatively coupled to the at least one processor, and a memory communicatively coupled to the at least one processor. The at least one processor may be configured to configure to monitor a plurality of semi-persistent scheduling (SPS) occasions based on an SPS configuration, receive, from a base station, group common downlink control information (DCI) that indicates cancellation of one or more SPS occasions of the plurality of SPS occasions, the group common DCI being associated with a UE group that includes one or more UEs including the UE, and refrain from monitoring the one or more SPS occasions based on the group common DCI to cancel the one or more SPS occasions.

In another example, a non-transitory processor-readable storage medium having instructions for a UE thereon may be disclosed. The instructions, when executed by a processing circuit, cause the processing circuit to configure to monitor a plurality of semi-persistent scheduling (SPS) occasions based on an SPS configuration, receive, from a base station, group common downlink control information (DCI) that indicates cancellation of one or more SPS occasions of the plurality of SPS occasions, the group common DCI being associated with a UE group that includes one or more UEs including the UE, and refrain from monitoring the one or more SPS occasions based on the group common DCI to cancel the one or more SPS occasions.

In a further example, a UE for wireless communication may be disclosed. The base station includes means for configuring to monitor a plurality of semi-persistent scheduling (SPS) occasions based on an SPS configuration, means for receiving, from a base station, group common downlink control information (DCI) that indicates cancellation of one or more SPS occasions of the plurality of SPS occasions, the group common DCI being associated with a UE group that includes one or more UEs including the UE, and means for refraining from monitoring the one or more SPS occasions based on the group common DCI to cancel the one or more SPS occasions.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
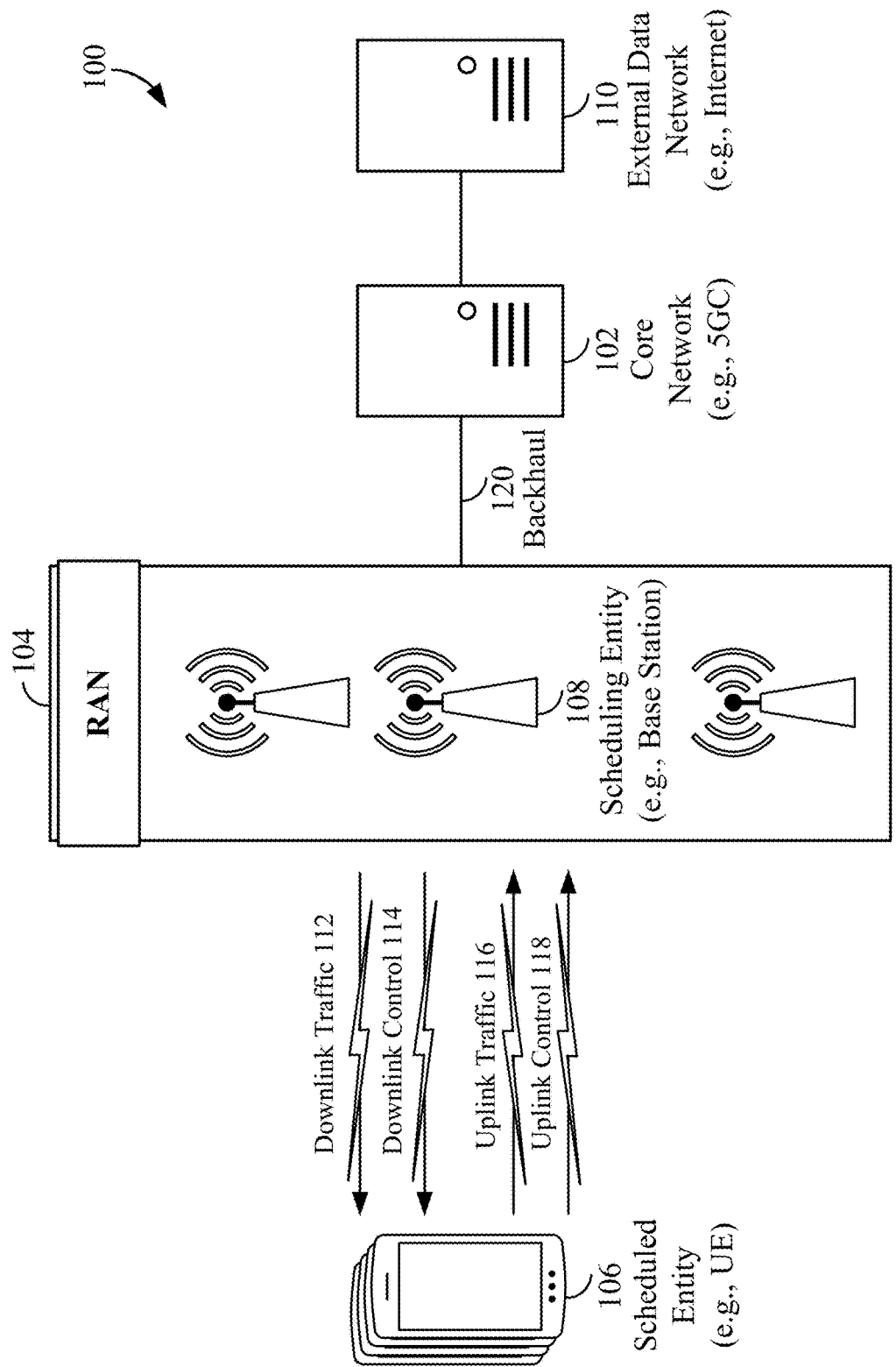
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

When a base station transmits control information such as downlink control information (DCI), the base station generally transmits each DCI separately for each UE. The base station may transmit DCI to perform a task related to semi-persistent scheduling (SPS). For example, the base station may transmit DCI to cancel one or more SPS occasions. When the base station transmits DCI for SPS cancellation, the base station transmits each DCI for SPS cancellation separately to each of the UEs. Hence, if a number of UEs increases, a number of DCI transmissions increases. According to some aspects of the disclosure, the base station may associate UEs with particular UE groups, and for UEs of each group, group common DCI for SPS cancellation may be transmitted. Hence, one transmission of group common DCI for SPS cancellation may be performed for UEs of a respective group. The group common DCI for SPS cancellation may be generated based on an SPS cancellation radio network temporary identifier (RNTI), and the UEs of the respective group may receive the group common DCI for SPS cancellation based on the SPS cancellation RNTI.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 can transmit uplink control information 118 to the network (e.g., scheduling entity 108).

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
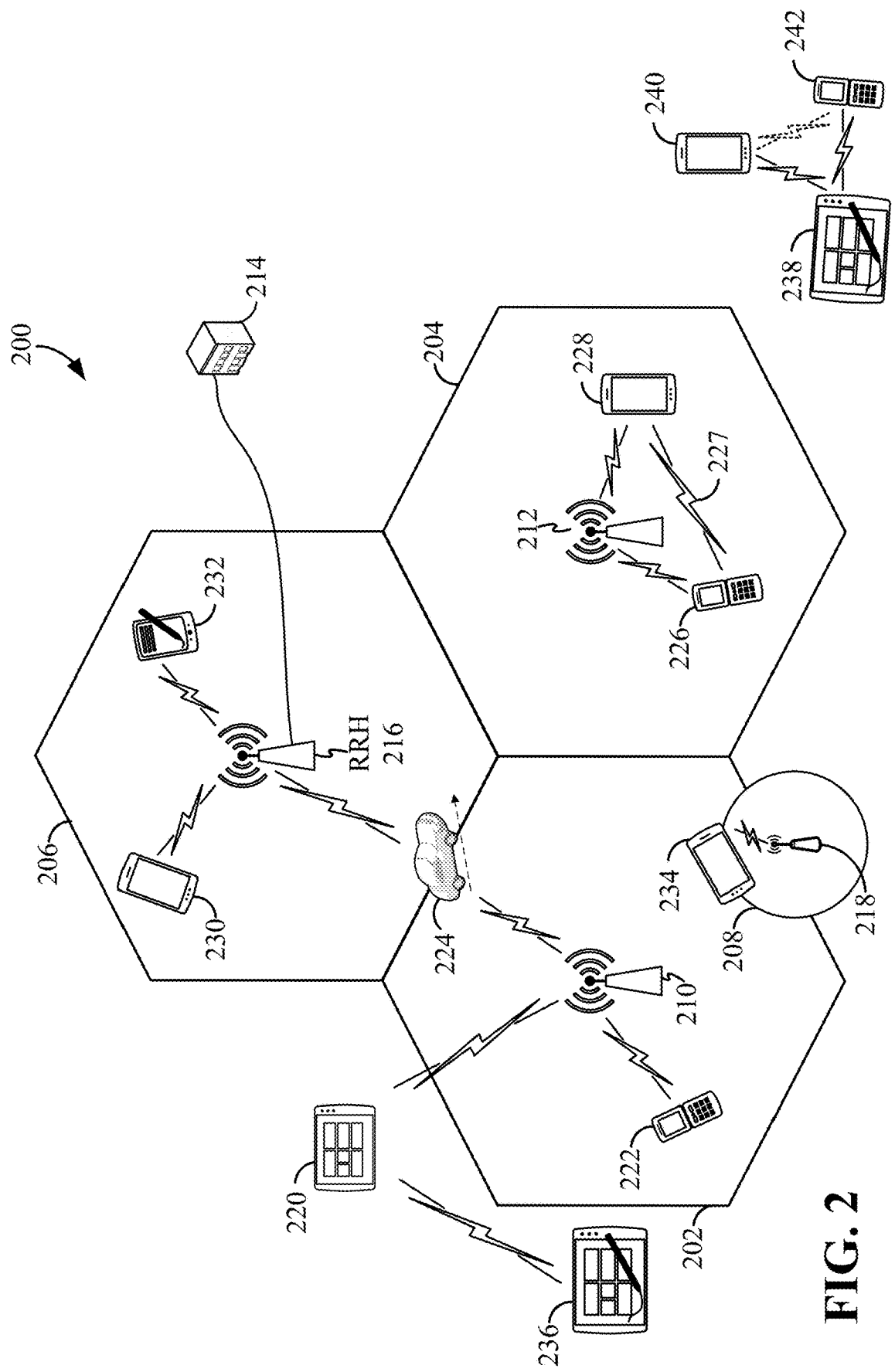
FIG. 2 is an illustration of an example of a radio access network according to some aspects.

FIG. 2 is an illustration of a radio access network (RAN) 200 according to some aspects. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a mobile device 220, which may be configured to function as a base station. That is, in some examples, a cell may not necessarily be stationary, and the geographic area of the cell may move according to the location of a mobile base station such as the mobile device 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., mobile device 220) may be configured to function as a UE. For example, the mobile device 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from the base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Figure 3:
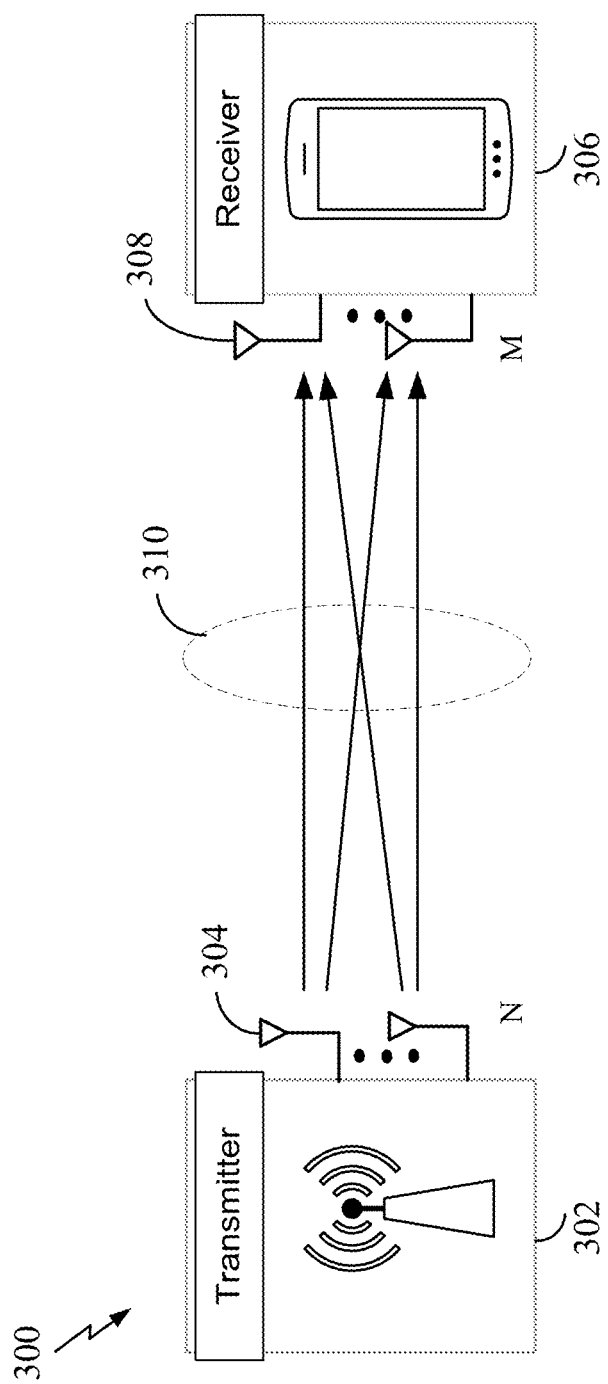
FIG. 3 is a block diagram illustrating a transmitting device and a receiving device supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit demodulation reference signal (DMRS) and/or channel-state information reference signals (CSI-RS) with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated by an example diagram 400 in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms as well as other waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., physical downlink control channel (PDCCH)), and the data region 414 may carry data channels (e.g., PDCCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
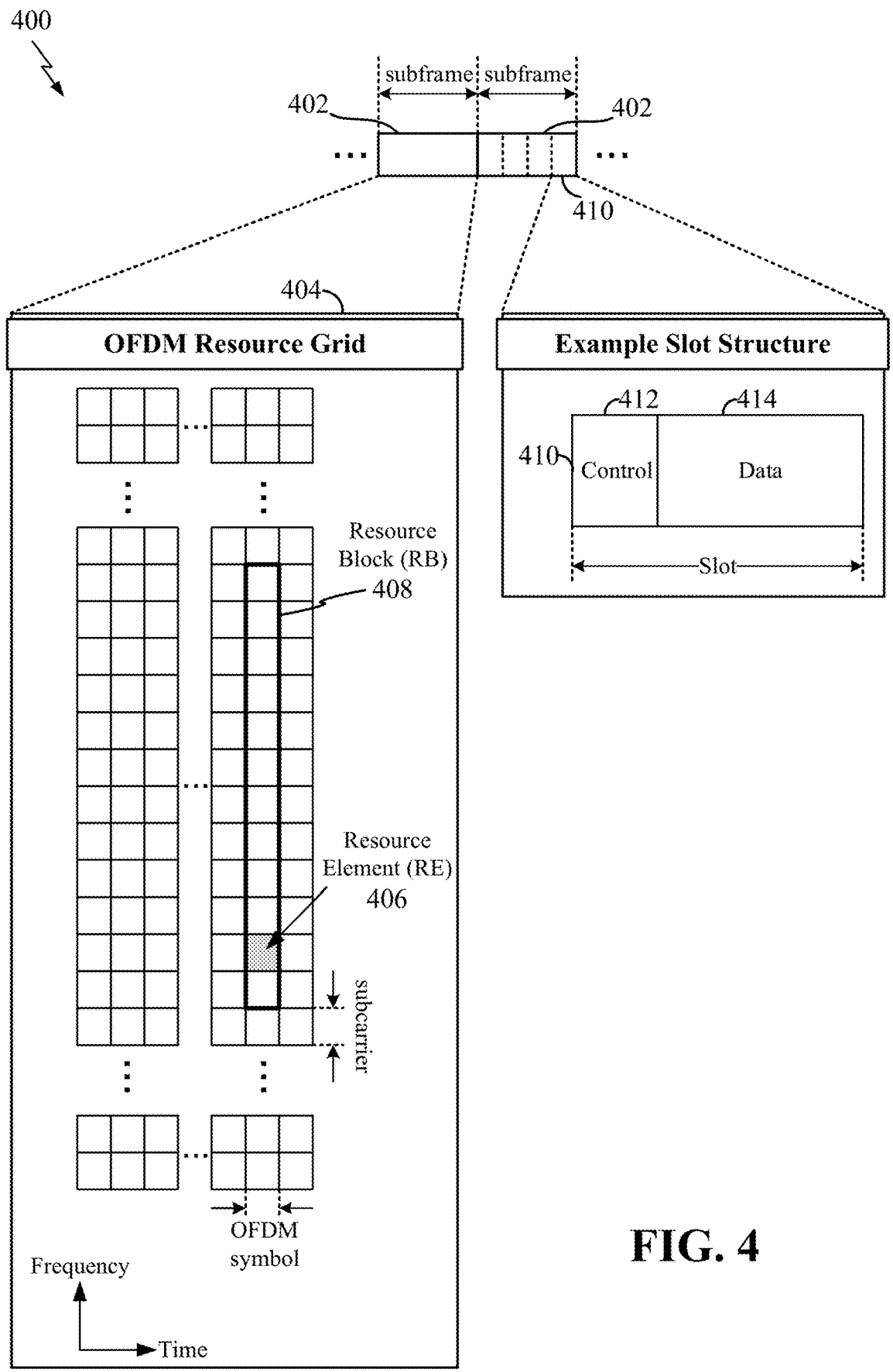
FIG. 4 is a schematic illustration of an organization of wireless resources in an air interface utilizing orthogonal frequency divisional multiplexing (OFDM) according to some aspects.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DMRS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure. The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information (UCI) 118. The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DMRS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Scheduling is a process of allocating communication resources (e.g., time, frequency, and spatial resources) in a wireless communication system 100. A base station 108 (e.g., gNB or eNB) can schedule communication resources using a dynamic scheduling method or semi-persistent scheduling (SPS) method. In dynamic scheduling, the base station can schedule resources for each data communication (e.g., PDSCH/PUSCH, and PUCCH) using DCI. To reduce communication overhead, the base station can schedule resources in a semi-static or semi-persistent manner using SPS. For example, using SPS, the base station can configure one or more SPS occasions using one or more radio resource control (RRC) messages (e.g., SPS-Config). Each SPS occasion can include downlink (DL) resources and/or uplink (UL) resources. Using SPS, the base station transmits a single trigger signal (e.g., DCI) for one or more SPS occasions configured in an SPS configuration.

Figure 5:
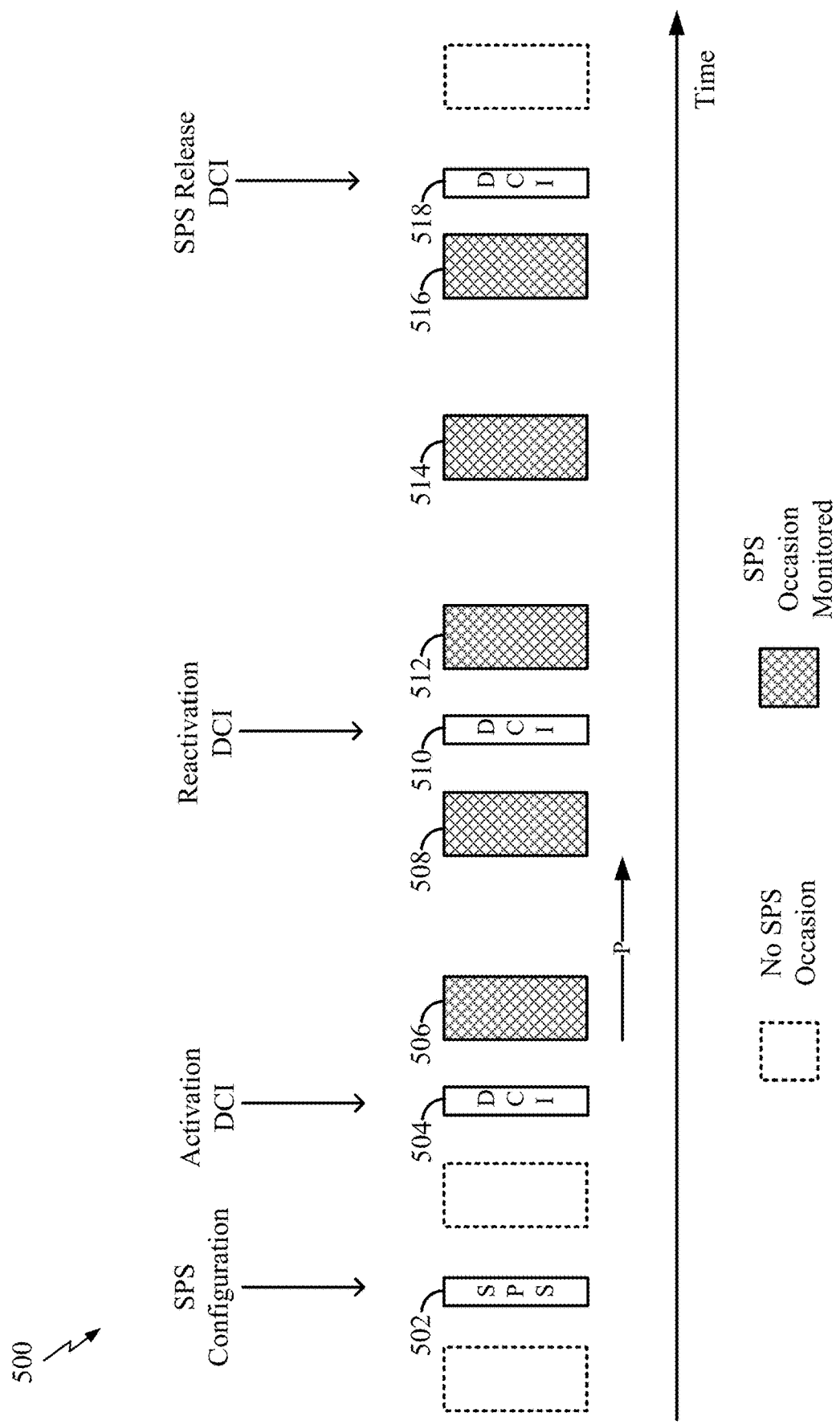
FIG. 5 is an example diagram illustrating an exemplary semi-persistent scheduling (SPS) configuration for wireless communication according to some aspects.

FIG. 5 is an example diagram 500 illustrating an exemplary SPS configuration for wireless communication according to some aspects. A base station (e.g., scheduling entity 108) can transmit one or more SPS configurations to a UE (e.g. UE 106) using SPS signaling 502. In one example, the SPS signaling 502 may be an RRC message that configures one or more SPS configurations. Each SPS configuration can be identifiable by a corresponding index value (e.g., index 0 for SPS configuration 0 and index 1 for SPS configuration 1). In some aspects, the base station can use a different index for each SPS configuration.

In some aspects, the same index can be used for a data SPS configuration for downlink data and a measurement SPS configuration for channel/interference measurements. The base station can configure both types of SPS configurations using RRC and/or MAC CE signaling. In addition to the SPS configuration index, the base station can include a field in a DCI to indicate whether the index signals the data SPS configuration or measurement SPS configuration. Therefore, the UE can determine whether the downlink data SPS configuration or the measurement SPS configuration is triggered by the index, and use the corresponding periodicity and feedback timing.

In some aspects, the RRC message may include a different index to identify each configured SPS configuration. An SPS configuration can schedule and allocate communication resources (e.g., time, frequency, and spatial resources) to SPS occasions that have a predetermined periodicity P. The base station can configure multiple SPS configurations for downlink data and/or channel measurements. From the index, the UE can identify a triggered SPS configuration and use the corresponding periodicity and feedback timing. In some aspects, an SPS configuration can include both downlink data and channel measurement resources across different SPS occasions. In some aspects, the SPS configuration may further allocate communication resources for transmitting HARQ feedback such as HARQ ACK or HARQ NACK.

After the SPS configuration(s) are configured, the base station can transmit activation DCI 504 (e.g., in a PDCCH) to activate the configured SPS configuration(s) at the UE. No SPS occasions are monitored by the UE prior to receiving the activation DCI 504. The activation DCI 504 may activate at least one SPS configuration, e.g., by indicating an index of an SPS configuration that is activated. In some examples, the activation DCI 504 can include one or more indexes to trigger one or more corresponding SPS configurations. In some examples, the activation DCI 504 may further indicate an index of an SPS configuration that is deactivated or reactivated. In some aspects, the activation DCI 504 may further indicate transmission parameters, such as MCS, resource allocations, antenna ports of an SPS transmission, DMRS configuration, beamforming, precoding, etc.

In some aspects, the base station can configure a set of bitmaps for triggering the combined SPS configuration, and use DCI to select one of the bitmaps to trigger the desired SPS occasions corresponding to the selected bitmap. The base station can use RRC or MAC CE to communicate the set of bitmaps to the UE to reduce the DCI payload. In some aspects, the bitmap can be a part of an SPS configuration. In this case, the base station can signal the selected bitmap using a bitmap index in the DCI.

The base station can use the activation DCI 504 to configure one or more transmission parameters, for example, MCS, resource allocations, antenna ports of an SPS transmission, DMRS configuration, beamforming, precoding, etc. For each activated SPS configuration, the UE can use PUCCH occasions for transmitting uplink control information (UCI) that may include HARQ feedback, scheduling request (SR), and a channel report that can include channel characteristic measurements and/or interference measurements.

A base station can use the above described SPS configurations or the like to efficiently schedule frequent or periodic channel and interference measurements with low signaling overhead. Therefore, the base station can have more up-to-date information on the channel characteristics from the UE's point of view. The UE measurements can help the base station in channel precoding, interference/noise/channel estimation and prediction, and MCS and transmission configuration selection. The UE also benefits from having up-to-date information on the channel characteristics, which can enhance noise/interference/channel estimation over time. Having up-to-date channel and interference information also enhances data decoding and can result in a lower error rate and a higher data rate.

In FIG. 5, after the activation DCI 504 activates a particular SPS configuration, the UE monitors SPS occasions such as SPS occasions 506 and 508, which have the periodicity P between successive SPS occasions. After the SPS occasion 508, the base station transmits reactivation DCI 510 to reactivate the configured SPS configuration(s) at the UE. In some examples, the reactivation DCI 510 may reactivate the configured SPS configuration by reconfiguring transmission parameters such as an MCS, resource allocations, antenna ports of an SPS transmission, a DMRS configuration, beamforming, precoding, etc. After receiving the reactivation DCI 510, the UE may monitor subsequent SPS occasions such as SPS occasions 512, 514, and 516, according to the parameters indicated in the reactivation DCI 510. For example, the SPS occasions 512, 514, and 516 may be monitored using the reconfigured transmission parameters according to the reactivation DCI 510.

When the UE receives an SPS release DCI 518, the UE deactivates the configured SPS configuration. For example, when the UE receives the SPS release DCI 518, the UE stops monitoring subsequent SPS occasions.

In some cases, after the SPS configuration is activated, the base station may transmit SPS cancellation DCI to cause the base station to cancel one or more subsequent SPS occasions. The SPS cancellation DCI may indicate a number of SPS occasions to cancel. When the SPS cancellation DCI is received, the UE may skip monitoring an SPS occasion cancelled by the SPS cancellation DCI. For example, if the SPS cancellation DCI indicates one SPS occasion being cancelled, then the UE may skip monitoring one subsequent SPS occasion cancelled by the SPS cancellation DCI. In some aspects, the base station may transmit the SPS cancellation DCI to the UE when the base station does not have data to transmit to the UE. The SPS cancellation DCI is different from the SPS release DCI in that the SPS cancellation DCI indicates a defined number of SPS occasions to skip monitoring, while the SPS release DCI indefinitely deactivates monitoring for any subsequent SPS occasions until another activation DCI is received. For example, when the UE receives the SPS cancellation DCI, the UE may skip monitoring one or more subsequent SPS occasions cancelled by the SPS cancellation DCI, and then resume monitoring SPS occasions.

Figure 6:
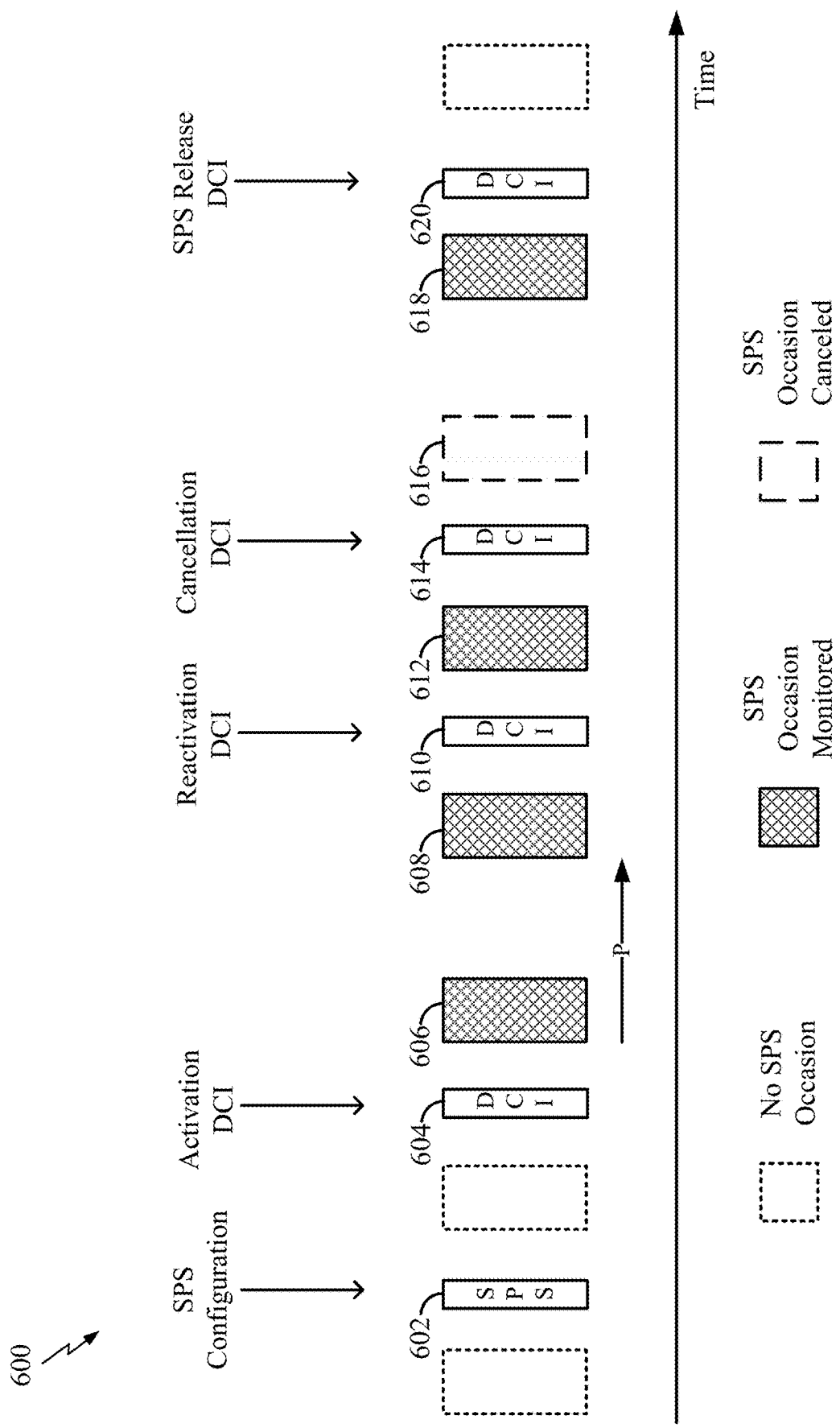
FIG. 6 is an example diagram illustrating an exemplary SPS configuration for wireless communication, with SPS cancellation downlink control information (DCI), according to some aspects.

FIG. 6 is an example diagram 600 illustrating an exemplary SPS configuration for wireless communication, with SPS cancellation DCI, according to some aspects. A base station (e.g., scheduling entity 108) can transmit one or more SPS configurations to a UE (e.g., UE 106) using SPS signaling 602. Details of the SPS configurations and various types of DCI including activation DCI, reactivation DCI, and an SPS release DCI are omitted for brevity, as they are discussed above in reference to FIG. 5. After the SPS configuration(s) are configured, the base station can transmit activation DCI 604 (e.g., in a PDCCH) to activate the configured SPS configuration(s) at the UE. No SPS occasions are monitored by the UE prior to receiving the activation DCI 604. The activation DCI 604 may activate at least one SPS configuration, e.g., by indicating the index of an SPS configuration that is activated.

In FIG. 6, after the activation DCI 604 activates a particular SPS configuration, the UE monitors SPS occasions such as SPS occasions 606 and 608, which have the periodicity P between successive SPS occasions. After the SPS occasion 608, the base station transmits reactivation DCI 610 to reactivate the configured SPS configuration(s) at the UE. In some examples, the reactivation DCI 610 may reactivate the configured SPS configuration by reconfiguring transmission parameters such as an MCS, resource allocations, antenna ports of an SPS transmission, a DMRS configuration, beamforming, precoding, etc. After receiving the reactivation DCI 610, the UE may monitor subsequent SPS occasions such as SPS occasions 612 and 618, according to the parameters indicated in the reactivation DCI 610. For example, the SPS occasions 612 and 618 may be monitored using the reconfigured transmission parameters according to the reactivation DCI 610.

In FIG. 6, after the SPS occasion 612, the base station transmits SPS cancellation DCI 614 to cancel one or more SPS occasions occurring after the SPS cancellation DCI is received by the UE. The SPS cancellation DCI may indicate a number of SPS occasions to cancel. In the example shown in FIG. 6, the SPS cancellation DCI 614 indicates to cancels one subsequent SPS occasion, and thus the UE does not monitor an SPS occasion at an allocated portion 616 (e.g., configured by the reactivation DCI 610). After skipping the allocated portion 616 according to the SPS cancellation DCI 614, the UE may resume monitoring a subsequent SPS occasion such as an SPS occasion 618.

When the UE receives an SPS release DCI 620, the UE deactivates the configured SPS configuration. For example, when the UE receives the SPS release DCI 620, the UE stops monitoring subsequent SPS occasions.

Figure 7:
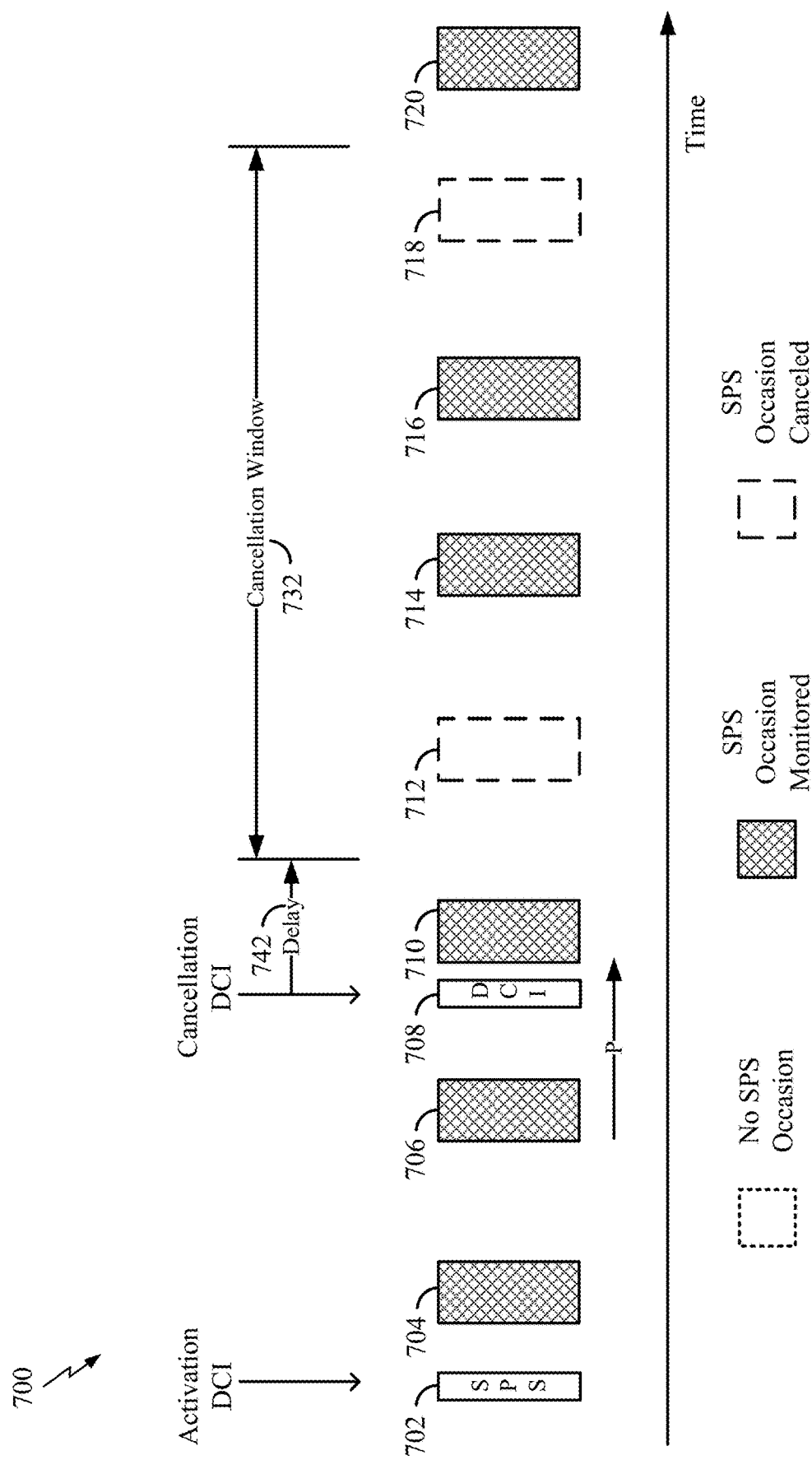
FIG. 7 is an example diagram illustrating a bitmap for SPS cancellation in SPS cancellation DCI, according to some aspects.

FIG. 7 is an example diagram 700 illustrating a bitmap for SPS cancellation in SPS cancellation DCI, according to some aspects. Details of the SPS configurations and various types of DCI including activation DCI, reactivation DCI, and an SPS release DCI are omitted for brevity, as they are discussed above in reference to FIG. 5. After the SPS configuration(s) are configured, a base station (e.g., scheduling entity 108) can transmit activation DCI 702 (e.g., in a PDCCH) to activate the configured SPS configuration(s) at a UE (e.g., UE 106). No SPS occasions may be monitored by the UE prior to receiving the activation DCI 702. The activation DCI 702 may activate at least one SPS configuration, e.g., by indicating the index of an SPS configuration that is activated.

In FIG. 7, after the activation DCI 702 activates a particular SPS configuration, the UE monitors SPS occasions such as SPS occasions 704, 706, and 710, which have the periodicity P between successive SPS occasions. After the SPS occasion 706, the base station transmits SPS cancellation DCI 708 to cancel one or more SPS occasions following after the SPS cancellation DCI 708 is received by the UE.

The SPS cancellation DCI may indicate a number of SPS occasions to cancel. For example, the SPS cancellation DCI may indicate to cancel four subsequent SPS occasions, which may be indicated by an SPS cancellation window (e.g., in time) spanning over four SPS occasions, where the SPS cancellation window may be included in the SPS cancellation DCI.

The SPS cancellation DCI may include a bitmap with X number of bits, where X may be an integer. The value of X may be configured via an RRC message. A value of the x-th bit in the bitmap may indicate whether the x-th SPS occasion in the cancellation window is canceled. For example, the value of the x-th bit being 1 may indicate that the x-th SPs occasion in the cancellation window is canceled, and the value of the x-th bit being 0 may indicate that the x-th SPs occasion in the cancellation window is not canceled.

Hence, the bitmap included in the SPS cancellation may indicate that not all of the SPS occasions within the cancellation window are actually canceled. In FIG. 7, the SPS cancellation DCI 714 may indicate four SPS occasions, which may be indicated by an SPS cancellation window 732 in the SPS cancellation DCI 714. In FIG. 7, X is 4, and the SPS cancellation window 732 covers four subsequent SPS occasions at 712, 714, 716, and 718. The SPS cancellation window 732 may start with a delay 742 after receiving the SPS cancellation DCI 708. The bitmap 722 in FIG. 7 indicates four values including 1, 0, 0, and 1. Therefore, the UE cancels the first and the fourth SPS occasions within the SPS cancellation window 732, at 712 and 718 respectively. The UE monitors the second and third SPS occasions within the SPS cancellation window 732, at 714 and 716 respectively. After the SPS cancellation window 732 ends, the UE may resume monitoring a subsequent SPS occasion such as an SPS occasion 720.

Figure 8:
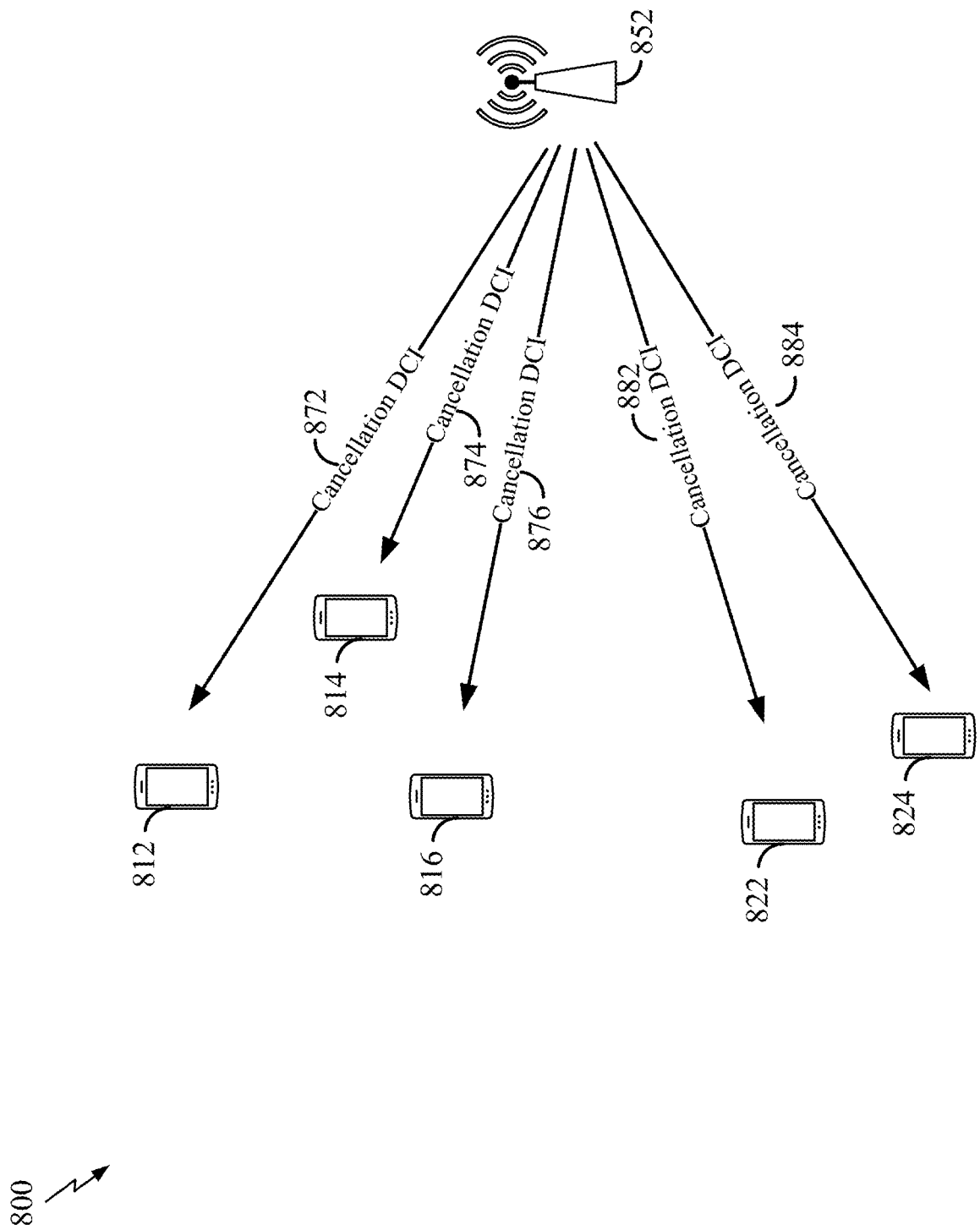
FIG. 8 is an example diagram illustrating interactions between a base station and multiple UEs.

A cell (e.g., operated by a base station) may have multiple UEs camped on the cell, each configured with one or more SPS configurations. The base station operating the cell may transmit separate DCI to each of the multiple UEs camped on the cell via a separate DL transmission. FIG. 8 is an example diagram 800 illustrating interactions between a base station and multiple UEs. UEs 812, 814, 816, 822, and 824 may be camped on a cell operated by the base station 852. When the base station 852 transmits DCI such as SPS cancellation DCI, the base station 852 performs separate transmissions of multiple respective DCI to respective UEs, where each DCI is transmitted to a respective UE of the UEs 812, 814, 816, 822, and 824. In FIG. 8, the base station 852 may perform a transmission of an SPS cancellation DCI 872 to the UE 812, a transmission of an SPS cancellation DCI 874 to the UE 814, and a transmission of an SPS cancellation DCI 876 to the UE 816, separately. The base station 852 may further perform a transmission of an SPS cancellation DCI 882 to the UE 822, and a transmission of an SPS cancellation DCI 884 to the UE 824, separately.

If a number of the multiple UEs per cell is large, the DL control overhead to send dedicated DCI separately to each of the multiple UEs may become large. Therefore, group common (GC) DCI may be introduced to reduce DL control overhead, where a single group common DCI may be transmitted to a group of UEs, instead of sending a separate DCI in a separate transmission to each of the UEs. Because a group common DCI may be transmitted to multiple UEs in a single transmission, the transmission of the group common DCI to the multiple UEs causes less overhead than using multiple transmissions of respective DCI to the multiple UEs.

In some aspects of the disclosure, group common (GC) DCI may be used to convey SPS cancellation to a group of UEs. In particular, the base station may place UEs into one or more UE groups, and may generate GC SPS cancellation DCI for each group. For example, the base station may generate a first GC SPS cancellation DCI for a first group of UEs and may generate a second GC SPS cancellation DCI for a second group of UEs. The GC SPS cancellation DCI may include information about SPS cancellations for UEs of a UE group corresponding to the GC SPS cancellation DCI. In an aspect, a group common DCI format such as DCI format 2_8 may be used for the GC SPS cancellation DCI. By transmitting a GC SPS cancellation DCI to UEs in a particular UE group, the base station may perform one transmission of the GC SPS cancellation DCI to convey information on SPS cancellations to respective UEs in the particular UE group, instead of performing separate multiple transmissions of separate multiple SPS cancellation DCIs to the respective UEs of the particular UE group. Hence, by using the GC cancellation DCI instead of using multiple SPS cancellation DCIs, overhead associated with DL may be reduced.

To generate each GC SPS cancellation DCI, a distinct identifier such as a distinct SPS-cancellation radio network temporary identifier (RNTI) may be used for each UE group, e.g., to identify each UE group. To each UE group, the base station may assign a unique SPS cancellation RNTI for a respective group. The base station may also configure UEs in each UE group to monitor a unique SPS cancellation RNTI to a respective UE group. The RNTI configurations to UEs of different UE groups may be used to convey the SPS cancellation RNTIs to respective UE groups. For example, the base station may transmit an RNTI configuration to the UE(s) of a particular UE group to configure these UE(s) to monitor downlink transmissions (e.g., DCI) with a unique SPS cancellation RNTI for this particular UE group indicated by the RNTI configuration. Each RNTI configuration may be transmitted via a respective RRC configuration message. Based on the RNTI configuration of a particular UE group, each UE of the particular UE group monitors DCI with a respective SPS cancellation RNTI, to receive a GC SPS cancellation DCI associated with the particular UE group.

Figure 9:
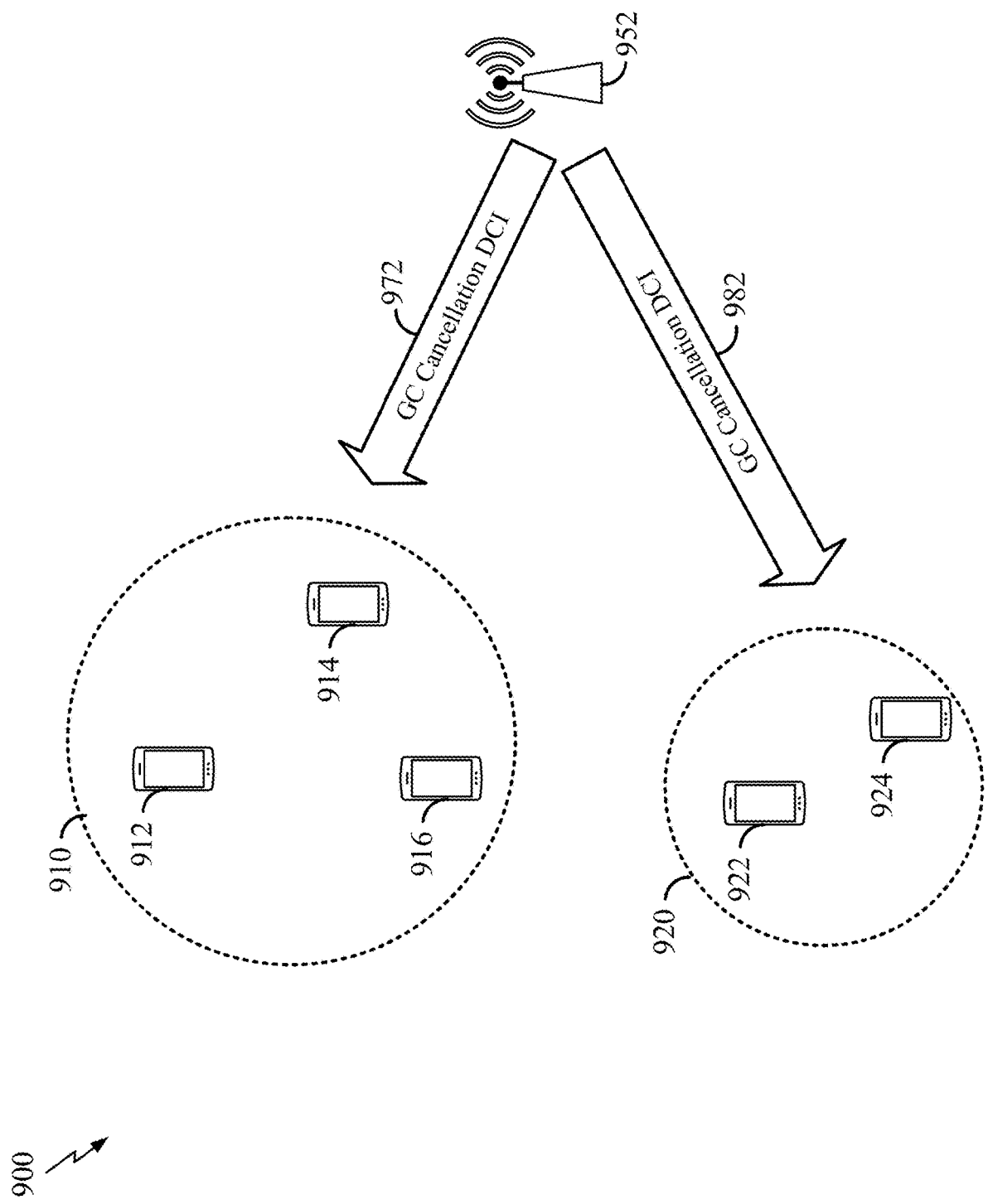
FIG. 9 is an example diagram illustrating interactions between a base station and different groups of UEs, according to some aspects.

FIG. 9 is an example diagram 900 illustrating interactions between a base station and different groups of UEs, according to some aspects. First UEs 912, 914, and 916 as well as second UEs 922 and 924 may be camped on a cell operated by a base station 952. The first UEs 912, 914, and 916 may be placed into a first UE group 910, and the second UEs 922 and 924 may be placed into a second UE group 920. For example, the base station 952 may place the first UEs 912, 914, and 916 into the first UE group 910, and the second UEs 922 and 924 into the second UE group 920, e.g., based on locations of the first UEs 912, 914, and 916 and the second UEs 922 and 924. Information on the locations of the first UEs 912, 914, and 916 and the second UEs 922 and 924 may be reported to the base station 952 by one or more of the first UEs 912, 914, and 916 and the second UEs 922 and 924.

The base station 952 may generate separate GC SPS cancellation DCI for each UE group. That is, common (e.g., same) GC SPS cancellation DCI is transmitted to all UEs within a group. In FIG. 9, the base station 952 transmits first GC SPS cancellation DCI 972 to the first UEs 912, 914, and 916 of the first UE group 910. The base station 954 also transmits second GC SPS cancellation DCI 982 to the second UEs 922 and 924 of the second UE group 920. The first GC SPS cancellation DCI 972 may be generated based on a first SPS cancellation RNTI associated with the first UE group 910, and the second GC SPS cancellation DCI 984 may be generated based on a second SPS cancellation RNTI associated with the second UE group 920. The first UEs 912, 914, and 916 may be configured with the first SPS cancellation RNTI by the base station 952, such that the first UEs 912, 914, and 916 may monitor and receive the first GC SPS cancellation DCI 972 based on the first SPS cancellation RNTI. Similarly, the second UEs 922 and 924 may be configured with the second SPS cancellation RNTI by the base station 952, such that the second UEs 922 and 924 may monitor and receive the second GC SPS cancellation DCI 974 based on the second SPS cancellation RNTI by the base station 952.

In some aspects, for each UE group, the base station may generate GC SPS cancellation DCI based on a number of UEs in the UE group, a number of SPS configurations per downlink bandwidth part (BWP) per UE in the UE group, and/or a number of SPS cancellation bitmap bits per SPS configuration in the UE group. For example, assuming that the number of UEs in the UE group is U, the number of SPS configurations per BWP per UE in the UE group is Y, and the number of SPS cancellation bitmap bits is X, a payload size of the GC SPS cancellation DCI (e.g., for DCI format 2-8) may be based on U*X*Y bits.

In an aspect, Y and X values may be static values, and may be based on a maximum possible size for the number of SPS configurations and the number of SPS cancellation bitmap bits, respectively. In this aspect, an equal number of bits in the GC SPS cancellation DCI may be allocated for each UE in the UE group. In this aspect, if a particular UE has a smaller number of SPS configurations than the Y value, then dummy bits may be used to fill the unused portion of the GC SPS cancellation DCI (e.g., for the unused portion within a portion corresponding to the Y value). Similarly, if a particular UE has a smaller number of SPS cancellation bitmap bits than the X value, then dummy bits may be used to fill the unused portion of the GC SPS cancellation DCI (e.g., for the unused portion within a portion corresponding to the X value). Further, if no SPS cancellation is to be performed for a particular UE, dummy bits may be used to fill the unused portion of the GC SPS cancellation DCI (e.g., for the unused portion within a portion corresponding to the X value and/or the Y value). In an aspect, the number of UEs in the UE group, the number of SPS configurations per BWP per UE, and/or the number of SPS cancellation bitmap bits may be transmitted to the UE, e.g., via an RRC message or the GC SPS cancellation DCI.

In an aspect, Y and X values may vary depending on a number of SPS configurations and a number of SPS cancellation bitmap bits for each UE. In this aspect, a different number of bits in the GC SPS cancellation DCI may be allocated for each UE in the UE group, depending on a number of SPS configurations and/or a number of SPS cancellation bitmap bits for each UE. In an aspect, the number of UEs in the UE group, the number of SPS configurations per BWP for a particular UE, and/or the number of SPS cancellation bitmap bits for the particular UE may be transmitted to the UE, e.g., via an RRC message or the GC SPS cancellation DCI.

In an aspect, the base station may identify one or more portions in a particular GC SPS cancellation DCI, where the one or more portions respectively correspond to one or more UEs of a particular UE group associated with the particular GC SPS cancellation DCI, and may transmit information on the one or more portions in the particular GC SPS cancellation DCI to the one or more UEs (e.g., via an RRC message). For example, the base station may indicate to each UE of the particular UE group a respective portion of bits associated with a respective UE in the DCI. In an aspect, the base station may indicate to each UE (e.g., via an RRC message) a respective portion of bits in the GC SPS cancellation DCI, e.g., with an offset indicating a starting position of the respective portion in the GC SPS cancellation DCI for a respective UE. In an aspect, each UE may read only a respective portion associated with a respective UE within the GC SPS cancellation DCI. In an aspect, the offsets for different UEs in the UE group may be different numbers of bits to define different starting positions for different portions respectively associated with the different UEs in the GC SPS cancellation DCI. In an aspect, the offsets may indicate different UEs by different numbers (e.g., 1, 2, 3, etc.) assigned to the different UEs. In this aspect, the UE may convert an offset to a starting position for a respective portion for the UE based on an equation, offset*X*Y.

Figure 10:
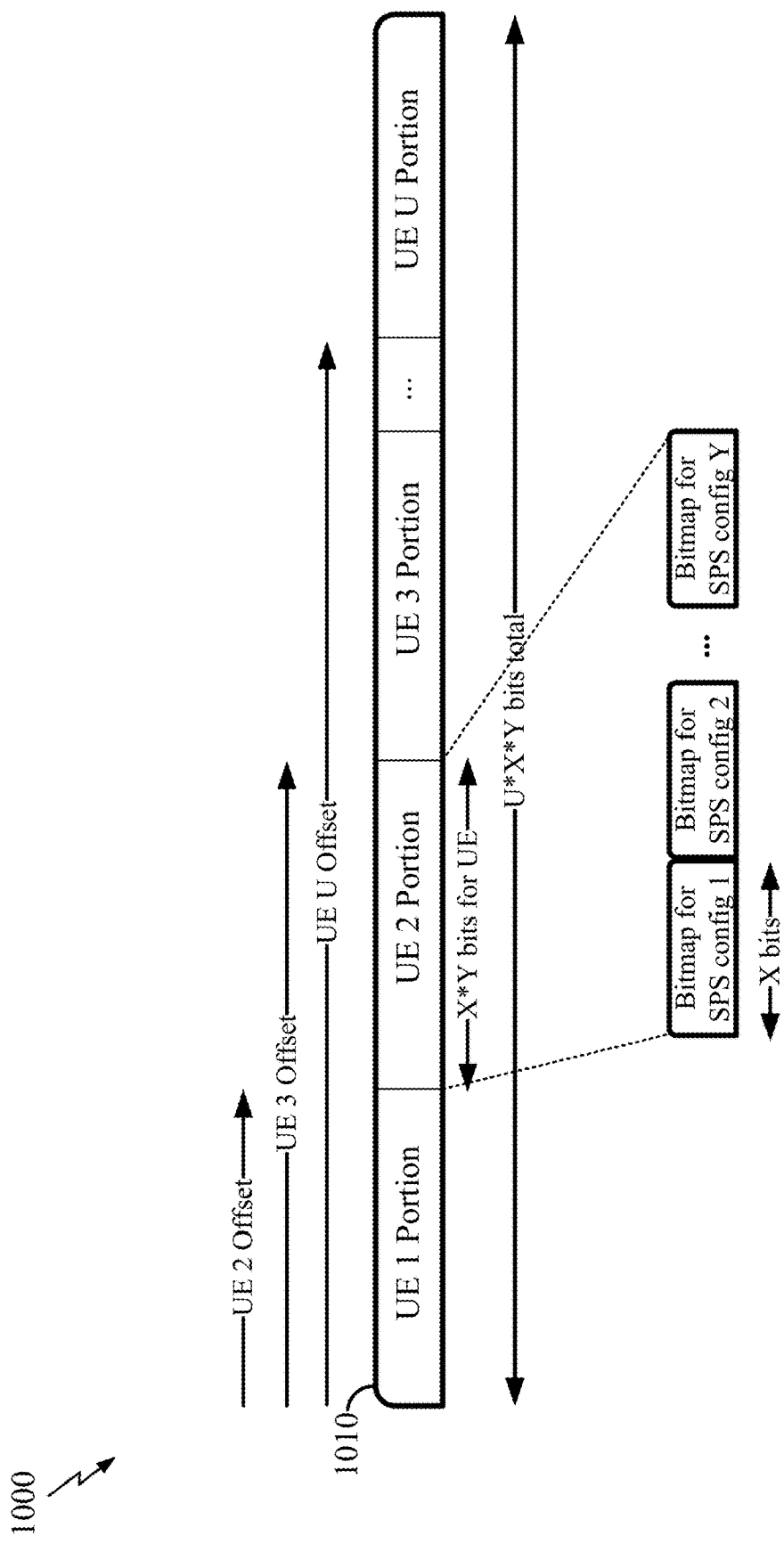
FIG. 10 is an example diagram illustrating a structure of a payload of group common (GC) SPS cancellation DCI, according to some aspects.

FIG. 10 is an example diagram 1000 illustrating a structure of a payload of GC SPS cancellation DCI, according to some aspects. The payload 1010 of the GC SPS cancellation DCI in FIG. 10 has U UE portions for U UEs in a UE group, where the number of SPS configurations per BWP per UE in the UE group is Y and the number of SPS cancellation bitmap bits is X. Hence, a size of the payload 1010 of the GC SPS cancellation DCI may be based on U*X*Y bits. A starting position of each UE portion may be identified based on an offset value. For example, a starting position of the UE 2 portion for UE 2 may be based on an offset value of a UE 2 offset, a starting position of the UE 3 portion for UE 3 may be based on an offset value of a UE 3 offset, and a starting position of the UE U portion for UE U may be based on an offset value of a UE U offset. In an example, a starting position of the first UE portion, such as the UE 1 portion for UE 1, may be based on an offset value of 0. Each UE portion may have a size of X*Y bits. For example, as shown in FIG. 10, the UE 2 portion may have bitmaps for Y SPS configurations, with X bits allocated for the bitmap for each SPS configuration.

In some aspects, DL transmissions may include DL component carriers in a DL carrier aggregation. For example, each carrier aggregation may include Z component carriers. In an aspect, when considering the carrier aggregation, the base station may generate GC SPS cancellation DCI for a UE group based on a number of component carriers per carrier aggregation, a number of UEs in the UE group, a number of SPS configurations per downlink bandwidth part (BWP) per UE in the UE group, and a number of SPS cancellation bitmap bits per SPS configuration in the UE group. For example, assuming that the number of UEs in the UE group is U, the number of component carriers per carrier aggregation is Z, the number of SPS configurations per BWP per UE in the UE group is Y, and the number of SPS cancellation bitmap bits is X, a payload size of the GC SPS cancellation DCI (e.g., for DCI format 2-8) may be based on U*Z*X*Y bits.

Figure 11:
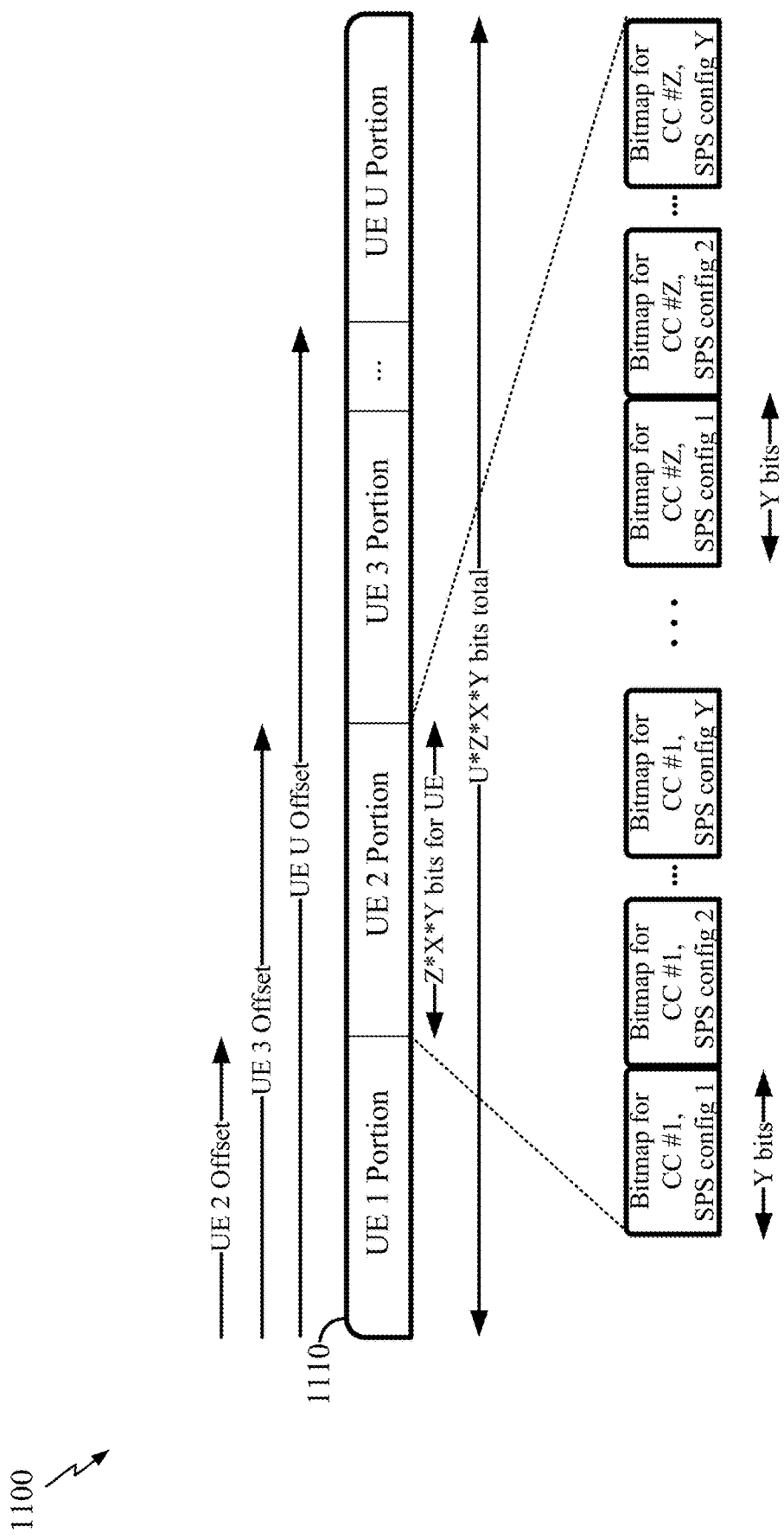
FIG. 11 is an example diagram illustrating a structure of a payload of GC SPS cancellation DCI for component carriers of a carrier aggregation, according to some aspects.

FIG. 11 is an example diagram 1100 illustrating a structure of a payload of GC SPS cancellation DCI for component carriers of a carrier aggregation, according to some aspects. The payload 1110 of the GC SPS cancellation DCI in FIG. 11 has U UE portions for U UEs in a UE group, where the number of SPS configurations per BWP per UE in the UE group is Y, the number of component carriers per carrier aggregation is Z, and the number of SPS cancellation bitmap bits is X. Hence, a size of the payload 1110 of the GC SPS cancellation DCI may be based on U*X*X*Y bits. A starting position of each UE portion may be identified based on an offset value. For example, a starting position of the UE 2 portion for UE 2 may be based on an offset value of a UE 2 offset, a starting position of the UE 3 portion for UE 3 may be based on an offset value of a UE 3 offset, and a starting position of the UE U portion for UE U may be based on an offset value of a UE U offset. In an example, a starting position of the first UE portion, such as the UE 1 portion for UE 1, may be based on an offset value of 0. Each UE portion may have a size of Z*X*Y bits, since the number of component carriers is Z. For example, as shown in FIG. 11, the UE 2 portion may have bitmaps for Y SPS configurations and Z component carriers, each of the Z component carriers having Y SPS configurations, with X bits allocated for the bitmap for each SPS configuration of a respective component carrier.

In an aspect, GC SPS cancellation DCI for each UE group may include multiple component carrier GC SPS cancellation DCIs respectively for multiple component carriers. If the number of component carriers is Z for a particular UE group, then Z component carrier GC SPS cancellation DCIs may be generated for the particular UE group. In an aspect, the base station may generate each component carrier GC SPS cancellation DCI for a UE group based on a number of UEs in the UE group, a number of SPS configurations per downlink BWP per UE in the UE group, and a number of SPS cancellation bitmap bits per SPS configuration in the UE group. For example, assuming that the number of UEs in the UE group is U, the number of SPS configurations per BWP per UE in the UE group is Y, and the number of SPS cancellation bitmap bits is X, a payload size of the component carrier GC SPS cancellation DCI (e.g., for DCI format 2-8) may be based on U*X*Y bits, and Z component carrier GC SPS cancellation DCIs may be generated respectively for Z component carriers of a carrier aggregation in the UE group. In an aspect, on a particular component carrier of a carrier aggregation, the base station may transmit the component carrier GC SPS cancellation DCI that is associated with the particular component carrier. In one aspect, no cross-component-carrier cancellation indication is included in the component carrier GC SPS cancellation DCI, and thus the GC SPS cancellation DCI received on a particular carrier component may indicate only cancellation of SPS occasion(s) on the particular carrier component.

Figure 12:
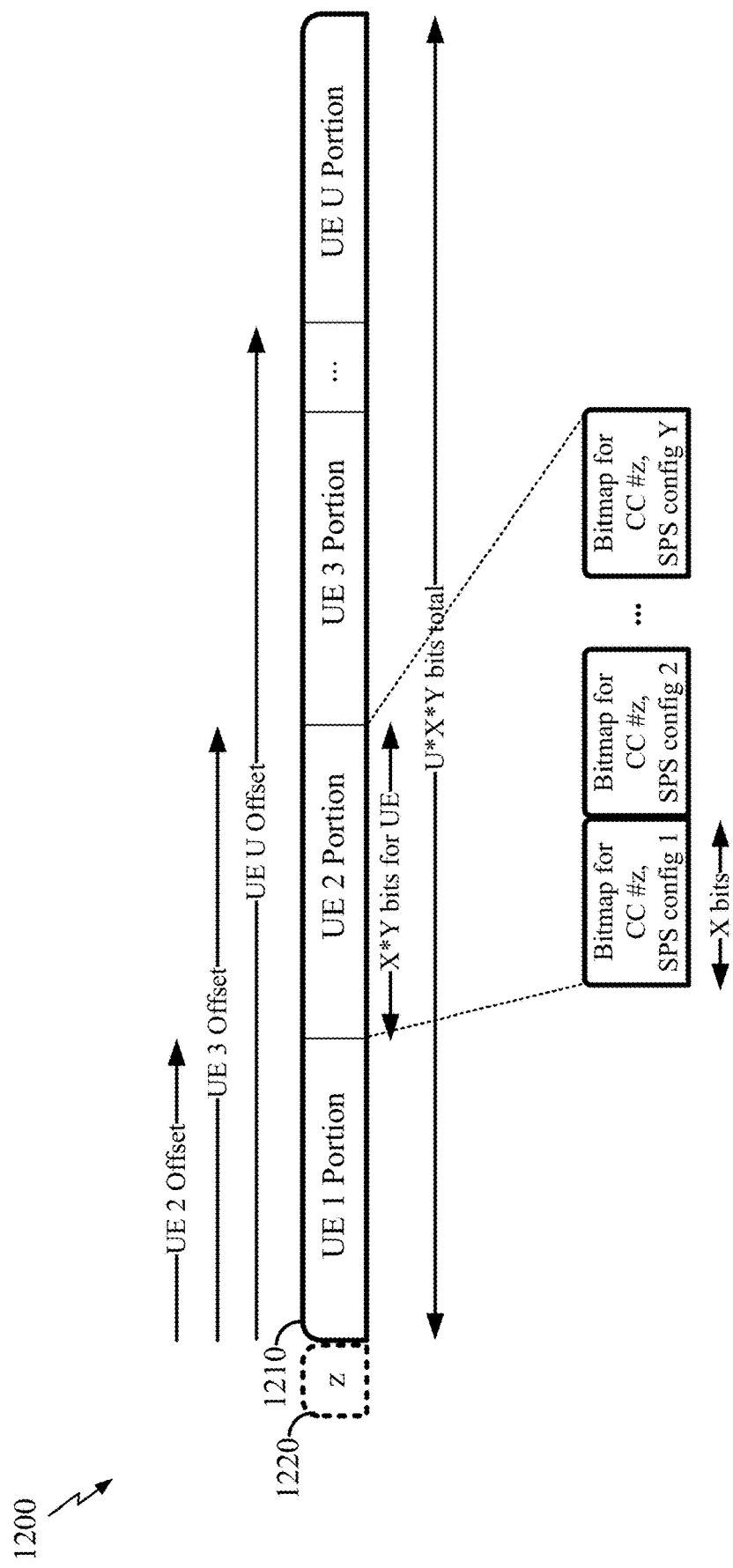
FIG. 12 is an example diagram illustrating a structure of a payload of component carrier GC SPS cancellation DCI for one of component carriers of a carrier aggregation, according to some aspects.

FIG. 12 is an example diagram 1200 illustrating a structure of a payload of component carrier GC SPS cancellation DCI for one of component carriers of a carrier aggregation, according to some aspects. The payload 1210 of the component carrier GC SPS cancellation DCI in FIG. 12 has U UE portions for U UEs in a UE group, where the number of SPS configurations per BWP per UE in the UE group is Y and the number of SPS cancellation bitmap bits is X. Hence, a size of the payload 1210 of the component carrier GC SPS cancellation DCI may be based on U*X*Y bits. A starting position of each UE portion may be identified based on an offset value. For example, a starting position of the UE 2 portion for UE 2 may be based on an offset value of a UE 2 offset, a starting position of the UE 3 portion for UE 3 may be based on an offset value of a UE 3 offset, and a starting position of the UE U portion for UE U may be based on an offset value of a UE U offset. Each UE portion may have a size of X*Y bits. For example, as shown in FIG. 12, the UE 2 portion may have bitmaps for Y SPS configurations, with X bits allocated for the bitmap for each SPS configuration, for a component carrier z of Z component carriers. In this example, a starting position of the first UE portion, such as the UE 1 portion for UE 1, may be based on an offset value of 0. Optionally, for example, the component carrier GC SPS cancellation DCI may include a component carrier index 1220 that indicates the component carrier (e.g., component carrier z) associated with the component carrier GC SPS cancellation DCI. In this example, a starting position of the first UE portion, such as the UE 1 portion for UE 1, may be based on a size of the component carrier index 1220.

In one aspect, cross-component-carrier cancellation indication may be included in the component carrier GC SPS cancellation DCI, and thus the component carrier GC SPS cancellation DCI received on a particular carrier component may indicate cancellation of SPS occasion(s) on a different carrier component. For example, the component carrier GC SPS cancellation DCI for a particular component carrier z may include a component carrier index indicating a different component carrier z' different from the particular component carrier z, such that SPS cancellation for the different component carrier z' may be indicated by the component carrier GC SPS cancellation DCI.

Figure 13:
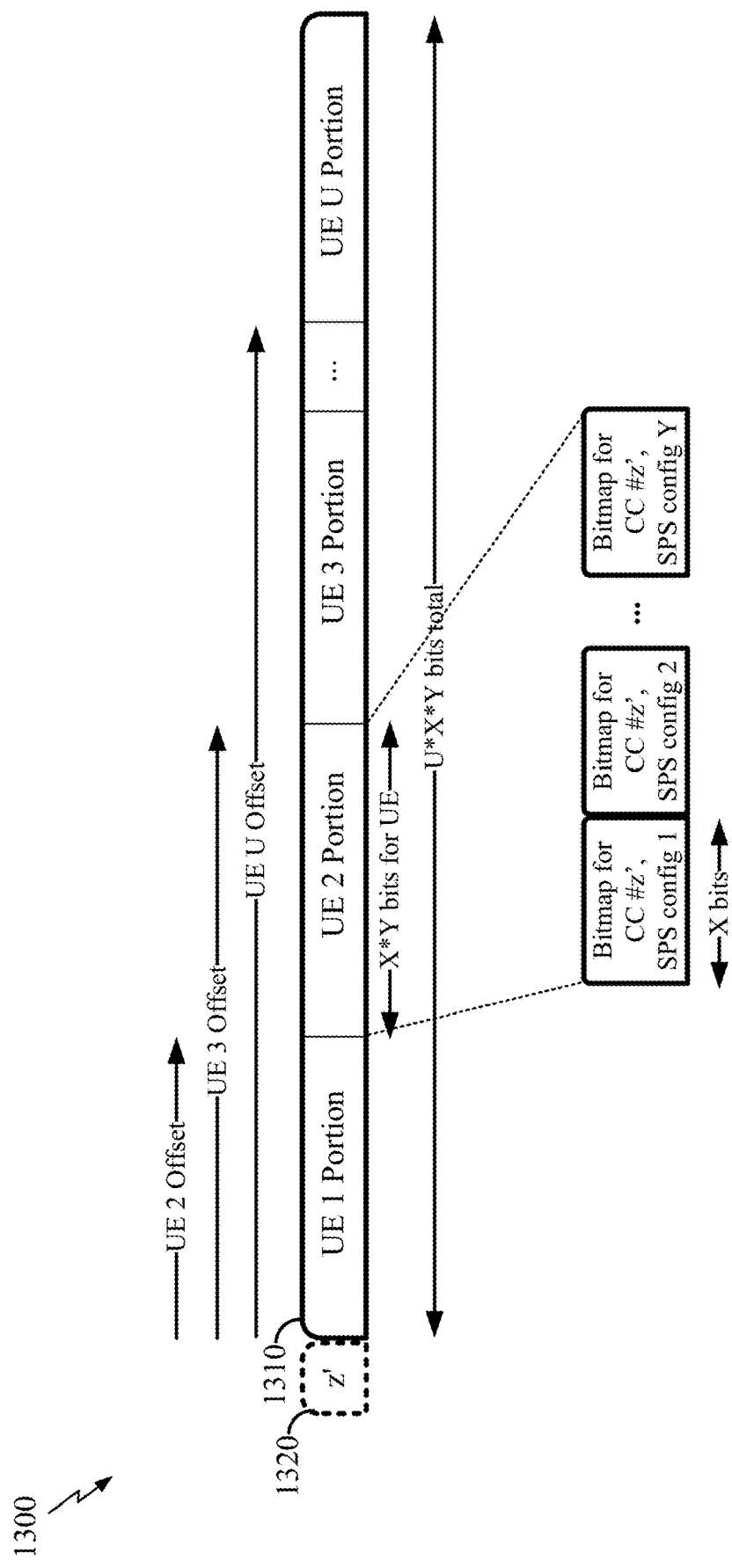
FIG. 13 is an example diagram illustrating a structure of a payload of component carrier GC SPS cancellation DCI for one of component carriers of a carrier aggregation, according to some aspects

FIG. 13 is an example diagram 1300 illustrating a structure of a payload of component carrier GC SPS cancellation DCI for one of component carriers of a carrier aggregation, according to some aspects. The component carrier GC SPS cancellation DCI is transmitted on a component carrier z. The payload 1310 of the component carrier GC SPS cancellation DCI in FIG. 13 has U UE portions for U UEs in a UE group, where the number of SPS configurations per BWP per UE in the UE group is Y and the number of SPS cancellation bitmap bits is X. Hence, a size of the payload 1310 of the component carrier GC SPS cancellation DCI may be based on U*X*Y bits. A starting position of each UE portion may be identified based on an offset value. For example, a starting position of the UE 2 portion for UE 2 may be based on an offset value of a UE 2 offset, a starting position of the UE 3 portion for UE 3 may be based on an offset value of a UE 3 offset, and a starting position of the UE U portion for UE U may be based on an offset value of a UE U offset. Each UE portion may have a size of X*Y bits. For example, as shown in FIG. 13, the UE 2 portion may have bitmaps for Y SPS configurations, with X bits allocated for the bitmap for each SPS configuration, for a component carrier z' of Z component carriers, which is different from the component carrier z on which the component carrier GC SPS cancellation DCI is received. In this example, a starting position of the first UE portion, such as the UE 1 portion for UE 1, may be based on an offset value of 0. Optionally, for example, the component carrier GC SPS cancellation DCI may include a component carrier index 1320 that indicates component carrier z' different from component carrier z associated with the component carrier GC SPS cancellation DCI. In this example, a starting position of the first UE portion, such as the UE 1 portion for UE 1, may be based on a size of the component carrier index 1320.

Figure 14:
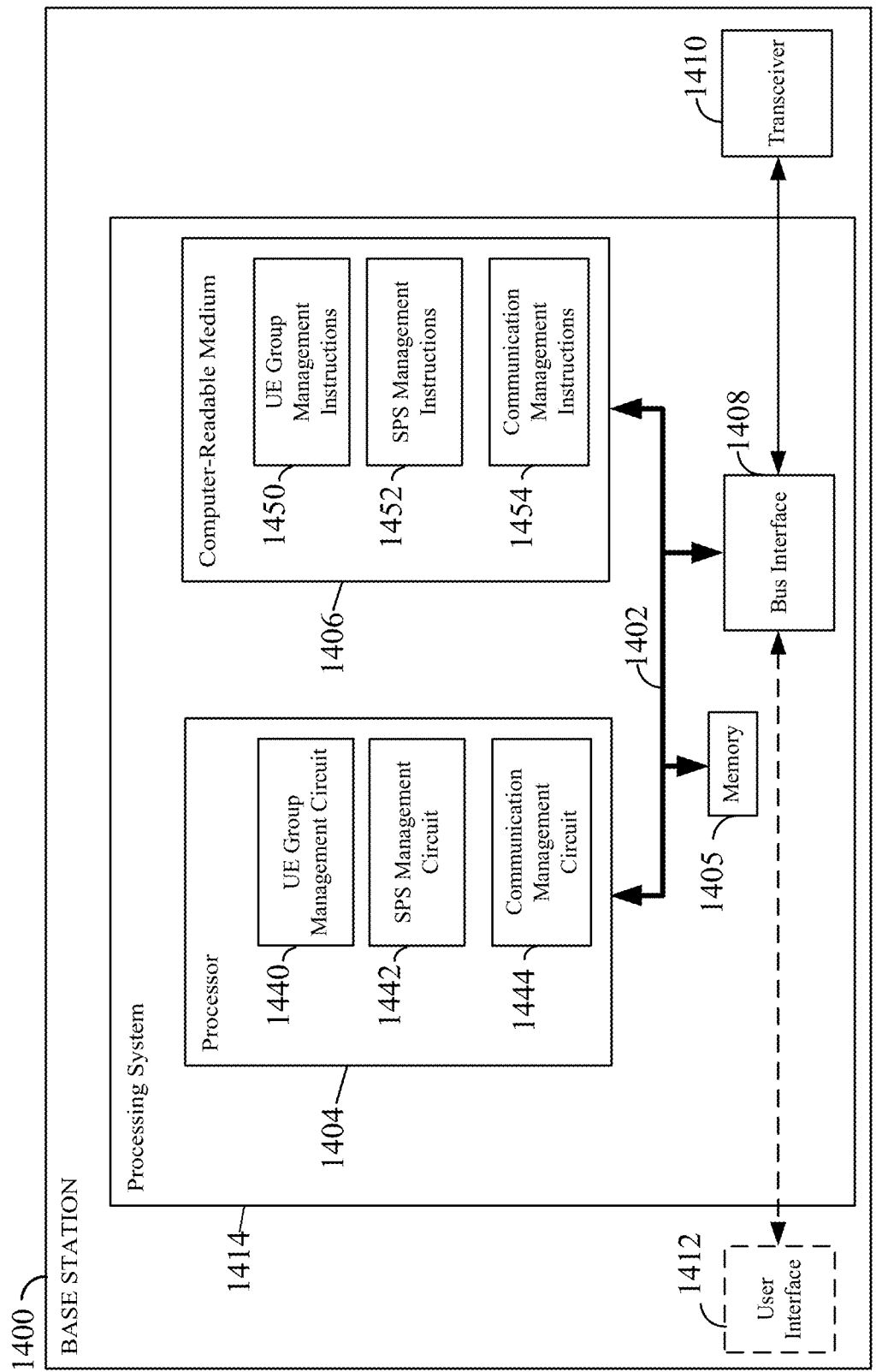
FIG. 14 is a block diagram conceptually illustrating an example of a hardware implementation for a base station according to some aspects of the disclosure.

FIG. 14 is a block diagram illustrating an example of a hardware implementation for a base station 1400 employing a processing system 1414. For example, the base station 1400 may be a base station as illustrated in any one or more of FIGS. 1, 2, 3, and/or 9.

The base station 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1400 may be configured to perform any one or more of the functions described herein. That is, the processor 1404, as utilized in a base station 1400, may be used to implement any one or more of the processes and procedures described below and illustrated in FIGS. 15-16.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable storage medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. Depending upon the nature of the apparatus, a user interface 1412 (e.g., keypad, display, speaker, microphone, joystick) may also be provided. Of course, such a user interface 1412 is optional, and may be omitted in some examples, such as a base station.

In some aspects of the disclosure, the processor 1404 may include UE group management circuit 1440 configured for various functions, including, for example, associating each of a plurality of UEs with a respective UE group of one or more UE groups, wherein the plurality of UEs are configured with a plurality of SPS configurations by the base station, each SPS configuration of the plurality of SPS configurations configuring a plurality of respective SPS occasions. For example, the UE group management circuit 1440 may be configured to implement one or more of the functions described below in relation to FIGS. 15-16, including, e.g., blocks 1502 and 1602.

In some aspects of the disclosure, the UE group management circuit 1440 may be configured for various functions, including, for example, assigning one or more SPS cancellation RNTIs respectively to the one or more UE groups. For example, the UE group management circuit 1440 may be configured to implement one or more of the functions described below in relation to FIG. 16, including, e.g., block 1606.

In some aspects of the disclosure, the processor 1404 may include SPS management circuit 1442 configured for various functions, including, for example, determining to cancel one or more SPS occasions associated with at least one of the plurality of SPS configurations. For example, the SPS management circuit 1442 may be configured to implement one or more of the functions described below in relation to FIGS. 15-16, including, e.g., blocks 1504 and 1604.

In some aspects of the disclosure, the SPS management circuit 1442 may be configured for various functions, including, for example, generating one or more group common DCI for the one or more UE groups to cancel the one or more SPS occasions. For example, the SPS management circuit 1442 may be configured to implement one or more of the functions described below in relation to FIGS. 15-16, including, e.g., blocks 1506 and 1610.

In some aspects of the disclosure, the SPS management circuit 1442 may be configured for various functions, including, for example, identifying one or more portions in each group common DCI that respectively correspond to one or more UEs of a respective UE group. For example, the SPS management circuit 1442 may be configured to implement one or more of the functions described below in relation to FIG. 16, including, e.g., block 1614.

In some aspects of the disclosure, the processor 1404 may include communication management circuit 1444 configured for various functions, including, for example, transmitting the one or more group common DCI to one or more UEs associated with the at least one of the plurality of SPS configurations. For example, the communication management circuit 1444 may be configured to implement one or more of the functions described below in relation to FIGS. 15-16, including, e.g., blocks 1508 and 1612.

In some aspects of the disclosure, the communication management circuit 1444 may be configured for various functions, including, for example, transmitting, to each UE of the plurality of UEs, a respective RNTI configuration to configure a respective UE of the plurality of UEs to monitor a downlink transmission with a respective SPS RNTI of the one or more SPS RNTIs that is assigned to a UE group associated with the respective UE. For example, the communication management circuit 1444 may be configured to implement one or more of the functions described below in relation to FIG. 16, including, e.g., block 1608.

In some aspects of the disclosure, the communication management circuit 1444 may be configured for various functions, including, for example, transmitting information on the one or more portions to the one or more UEs in the respective UE group. For example, the communication management circuit 1444 may be configured to implement one or more of the functions described below in relation to FIG. 16, including, e.g., block 1616.

The processor 1404 is responsible for managing the bus 1402 and general processing, including the execution of software stored on the computer-readable storage medium 1406. The software, when executed by the processor 1404, causes the processing system 1414 to perform the various functions described below for any particular apparatus. The computer-readable storage medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1406. The computer-readable storage medium 1406 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1406 may reside in the processing system 1414, external to the processing system 1414, or distributed across multiple entities including the processing system 1414. The computer-readable storage medium 1406 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 1406 may include UE group management software/instructions 1450 configured for various functions, including, for example, associating each of a plurality of UEs with a respective UE group of one or more UE groups, wherein the plurality of UEs are configured with a plurality of SPS configurations by the base station, each SPS configuration of the plurality of SPS configurations configuring a plurality of respective SPS occasions. For example, the UE group management software/instructions 1450 may be configured to implement one or more of the functions described below in relation to FIGS. 15-16, including, e.g., blocks 1502 and 1602.

In some aspects of the disclosure, the UE group management software/instructions 1450 may be configured for various functions, including, for example, assigning one or more SPS cancellation RNTIs respectively to the one or more UE groups. For example, the UE group management software/instructions 1450 may be configured to implement one or more of the functions described below in relation to FIG. 16, including, e.g., block 1606.

In some aspects of the disclosure, the computer-readable storage medium 1406 may include SPS management software/instructions 1452 configured for various functions, including, for example, determining to cancel one or more SPS occasions associated with at least one of the plurality of SPS configurations. For example, the SPS management software/instructions 1452 may be configured to implement one or more of the functions described below in relation to FIGS. 15-16, including, e.g., blocks 1504 and 1604.

In some aspects of the disclosure, the SPS management software/instructions 1452 may be configured for various functions, including, for example, generating one or more group common DCI for the one or more UE groups to cancel the one or more SPS occasions. For example, the SPS management software/instructions 1452 may be configured to implement one or more of the functions described below in relation to FIGS. 15-16, including, e.g., blocks 1506 and 1610.

In some aspects of the disclosure, the SPS management software/instructions 1452 may be configured for various functions, including, for example, identifying one or more portions in each group common DCI that respectively correspond to one or more UEs of a respective UE group. For example, the SPS management software/instructions 1452 may be configured to implement one or more of the functions described below in relation to FIG. 16, including, e.g., block 1614.

In some aspects of the disclosure, the computer-readable storage medium 1406 may include communication management software/instructions 1454 configured for various functions, including, for example, transmitting the one or more group common DCI to one or more UEs associated with the at least one of the plurality of SPS configurations. For example, the communication management software/instructions 1454 may be configured to implement one or more of the functions described below in relation to FIGS. 15-16, including, e.g., blocks 1508 and 1612.

In some aspects of the disclosure, the communication management software/instructions 1454 may be configured for various functions, including, for example, transmitting, to each UE of the plurality of UEs, a respective RNTI configuration to configure a respective UE of the plurality of UEs to monitor a downlink transmission with a respective SPS RNTI of the one or more SPS RNTIs that is assigned to a UE group associated with the respective UE. For example, the communication management software/instructions 1454 may be configured to implement one or more of the functions described below in relation to FIG. 16, including, e.g., block 1608.

In some aspects of the disclosure, the communication management software/instructions 1454 may be configured for various functions, including, for example, transmitting information on the one or more portions to the one or more UEs in the respective UE group. For example, the communication management software/instructions 1454 may be configured to implement one or more of the functions described below in relation to FIG. 16, including, e.g., block 1616.

Figure 15:
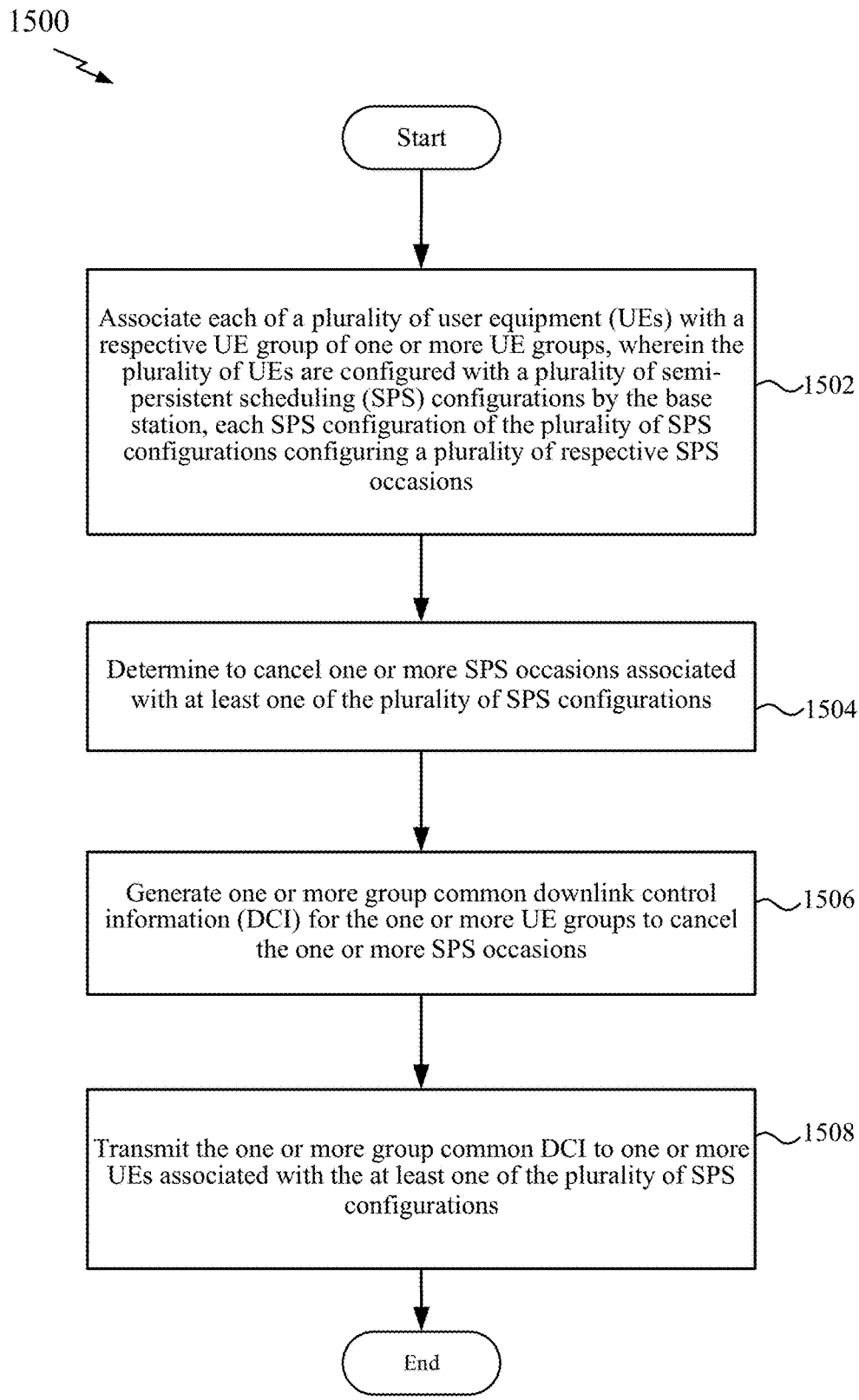
FIG. 15 is a flow chart illustrating an exemplary process for wireless communication at a base station using an SPS configuration according to some aspects.

FIG. 15 is a flow chart illustrating an exemplary process 1500 for wireless communication using an SPS configuration in accordance with some aspects. As described below, some or all illustrated features may be omitted in a particular implementation within the scope of the present disclosure, and some illustrated features may not be required for implementation of all embodiments. In some examples, the process 1500 may be carried out by the base station 1400 illustrated in FIG. 14. In some examples, the process 1500 may be carried out by any suitable apparatus or means for carrying out the functions or algorithm described below.

At block 1502, the base station may associate each of a plurality of UEs with a respective UE group of one or more UE groups, wherein the plurality of UEs are configured with a plurality of SPS configurations by the base station, each SPS configuration of the plurality of SPS configurations configuring a plurality of respective SPS occasions. In one aspect, the UE group management circuit 1440 may provide the means for associating each of the plurality of UEs with the respective UE group.

At block 1504, the base station may determine to cancel one or more SPS occasions associated with at least one of the plurality of SPS configurations. In one aspect, the SPS management circuit 1442 may provide the means for determining to cancel the one or more SPS occasions.

At block 1506, the base station may generate one or more group common DCI for the one or more UE groups to cancel the one or more SPS occasions. In one aspect, the SPS management circuit 1442 may provide the means for generating one or more group common DCI.

At block 1508, the base station may transmit the one or more group common DCI to one or more UEs associated with the at least one of the plurality of SPS configurations. In one aspect, the communication management circuit 1444 may provide the means for transmitting the one or more group common DCI.

Figure 16:
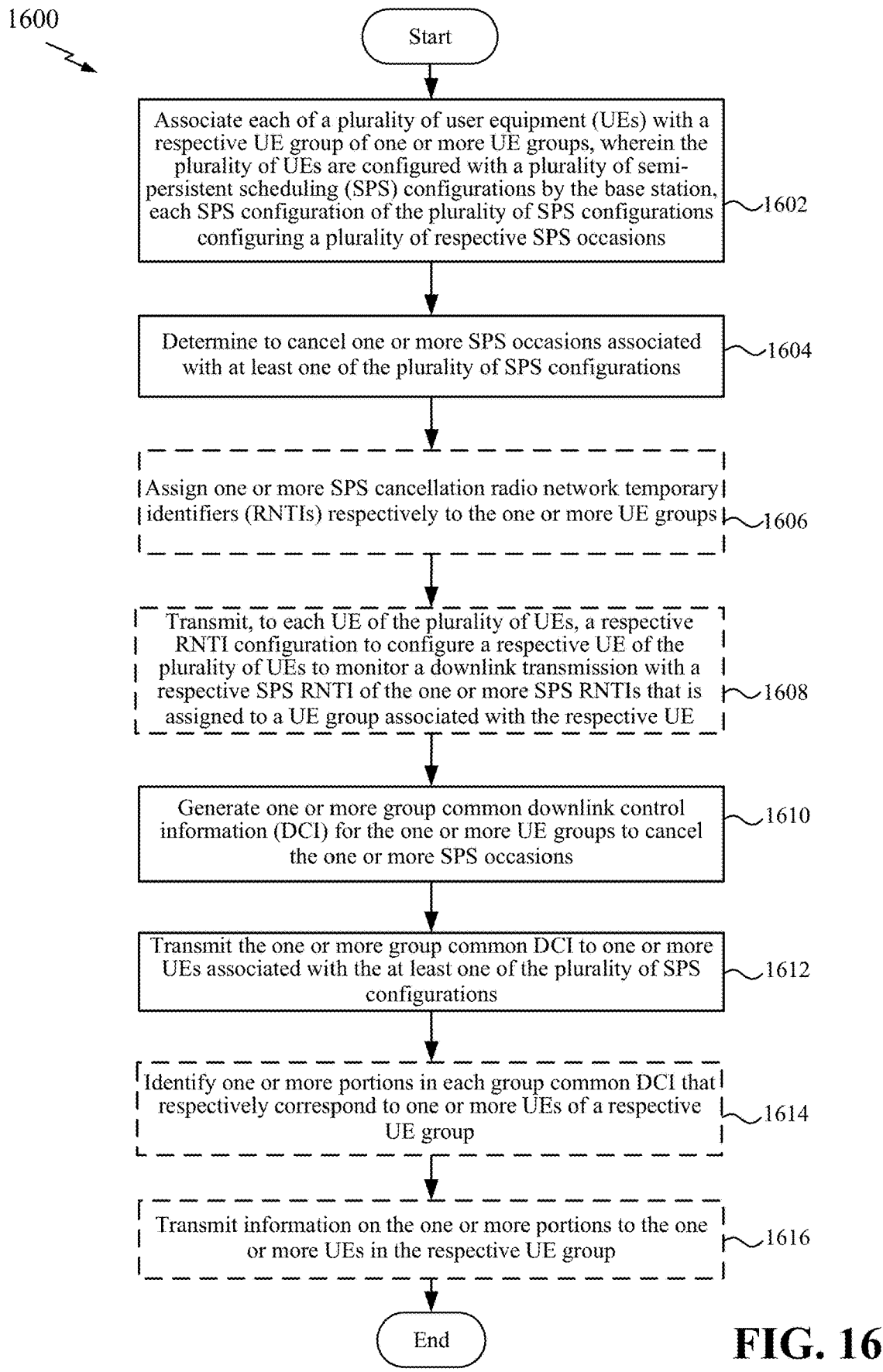
FIG. 16 is a flow chart illustrating an exemplary process for wireless communication at a base station according to some aspects.

FIG. 16 is a flow chart illustrating an exemplary process 1600 for wireless communication using an SPS configuration in accordance with some aspects. As described below, some or all illustrated features may be omitted in a particular implementation within the scope of the present disclosure, and some illustrated features may not be required for implementation of all embodiments. In some examples, the process 1600 may be carried out by the base station 1400 illustrated in FIG. 14. In some examples, the process 1600 may be carried out by any suitable apparatus or means for carrying out the functions or algorithm described below.

At block 1602, the base station may associate each of a plurality of UEs with a respective UE group of one or more UE groups, wherein the plurality of UEs are configured with a plurality of SPS configurations by the base station, each SPS configuration of the plurality of SPS configurations configuring a plurality of respective SPS occasions. In one aspect, the UE group management circuit 1440 may provide the means for associating each of the plurality of UEs with the respective UE group. In an aspect, each of the plurality of UEs is associated with the respective UE group of one or more UE groups based on a locations of a respective UE of the plurality of UEs.

At block 1604, the base station may determine to cancel one or more SPS occasions associated with at least one of the plurality of SPS configurations. In one aspect, the SPS management circuit 1442 may provide the means for determining to cancel the one or more SPS occasions.

In an aspect, at block 1606, the base station may assign one or more SPS cancellation RNTIs respectively to the one or more UE groups. In one aspect, the UE group management circuit 1440 may provide the means for assign the one or more SPS cancellation RNTIs respectively to the one or more UE groups.

In an aspect, at block 1608, the base station may transmit, to each UE of the plurality of UEs, a respective RNTI configuration to configure a respective UE of the plurality of UEs to monitor a downlink transmission with a respective SPS RNTI of the one or more SPS RNTIs that is assigned to a UE group associated with the respective UE. In one aspect, the communication management circuit 1444 may provide the means for transmitting the respective RNTI configuration.

At block 1610, the base station may generate one or more group common DCI for the one or more UE groups to cancel the one or more SPS occasions. In one aspect, the SPS management circuit 1442 may provide the means for generating one or more group common DCI.

In an aspect, generating the one or more group common DCI at block 1610 may be respectively based on the one or more SPS cancellation RNTI.

In an aspect, a size of each group common DCI of the one or more group common DCI is determined based on a number of UEs in a respective UE group of the one or more UE groups that is associated with a respective group common DCI, a number of SPS configurations per BWP per UE in the respective UE group, and a number of SPS cancellation bitmap bits per SPS configuration in the respective UE group.

In an aspect, the plurality of SPS configurations are associated with a plurality of component carriers in one or more carrier aggregations, and each of the one or more group common DCI comprises a plurality of component carrier group common DCI, and each component carrier group common DCI of the plurality of component carrier group common DCI is associated with a respective component carrier of the plurality of component carriers.

In an aspect, a size of each component carrier group common DCI of the plurality of component carrier group common DCI is determined based on a number of the plurality of component carriers, a number of UEs in a respective UE group of the one or more UE groups that is associated with a respective group common DCI, a number of SPS configurations per BWP per UE, and a number of SPS cancellation bitmap bits per SPS configuration.

In an aspect, a size of each component carrier group common DCI of the plurality of component carrier group common DCI is determined based on a number of UEs in a respective UE group of the one or more UE groups that is associated with a respective component carrier group common DCI, a number of SPS configurations per BWP per UE, and a number of SPS cancellation bitmap bits per SPS configuration. In an aspect, generating the one or more group common DCI includes generating the plurality of component carrier group common DCI for each UE that respectively correspond to the plurality of component carriers.

In an aspect, each component carrier group common DCI associated with the respective UE group indicates at least one of a first indication to cancel one or more SPS occasions within a component carrier associated with a respective component carrier group common DCI, or a second indication to cancel one or more SPS occasions within another component carrier associated with another group common DCI different from the respective component carrier group common DCI. In an aspect, the first indication includes an indicator for the component carrier associated with respective component carrier group common DCI, and the second indication includes an indicator for the another component carrier associated with the another group common DCI different from the respective component carrier group common DCI.

At block 1612, the base station may transmit the one or more group common DCI to one or more UEs associated with the at least one of the plurality of SPS configurations. In one aspect, the communication management circuit 1444 may provide the means for transmitting the one or more group common DCI. In an aspect, the respective RNTI configuration is transmitted via an RRC configuration message.

In an aspect, at block 1614, the base station may identify one or more portions in each group common DCI that respectively correspond to one or more UEs of a respective UE group. In one aspect, the SPS management circuit 1442 may provide the means for identifying the one or more portions in each group common DCI.

In an aspect, the information includes one or more offset bit numbers that are respectively associated with one or more UEs, and each of the one or more portions in a respective group common DCI is identified based on a respective offset bit number, the number of SPS configurations per downlink BWP per UE, and the number of SPS cancellation bitmap bits per SPS configuration.

In an aspect, at block 1616, the base station may transmit information on the one or more portions to the one or more UEs in the respective UE group. In one aspect, the communication management circuit 1444 may provide the means for transmitting the information on the one or more portions.

In one configuration, the base station 1400 for wireless communication includes means for associating each of a plurality of UEs with a respective UE group of one or more UE groups, wherein the plurality of UEs are configured with a plurality of SPS configurations by the base station, each SPS configuration of the plurality of SPS configurations configuring a plurality of respective SPS occasions, means for determining to cancel one or more SPS occasions associated with at least one of the plurality of SPS configurations, means for generating one or more group common DCI for the one or more UE groups to cancel the one or more SPS occasions, and means for transmitting the one or more group common DCI to one or more UEs associated with the at least one of the plurality of SPS configurations. The base station 1400 may further include means for assigning one or more SPS cancellation RNTIs respectively to the one or more UE groups, and means for transmitting, to each UE of the plurality of UEs, a respective RNTI configuration to configure a respective UE of the plurality of UEs to monitor a downlink transmission with a respective SPS RNTI of the one or more SPS RNTIs that is assigned to a UE group associated with the respective UE. The base station 1400 may further include means for identifying one or more portions in each group common DCI that respectively correspond to one or more UEs of a respective UE group, and means for transmitting information on the one or more portions to the one or more UEs in the respective UE group. In one aspect, the aforementioned means may be the processor(s) 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 2, 3, and/or 9, and utilizing, for example, the processes and/or algorithms described herein in relation to FIGS. 15 and/or 16.

Figure 17:
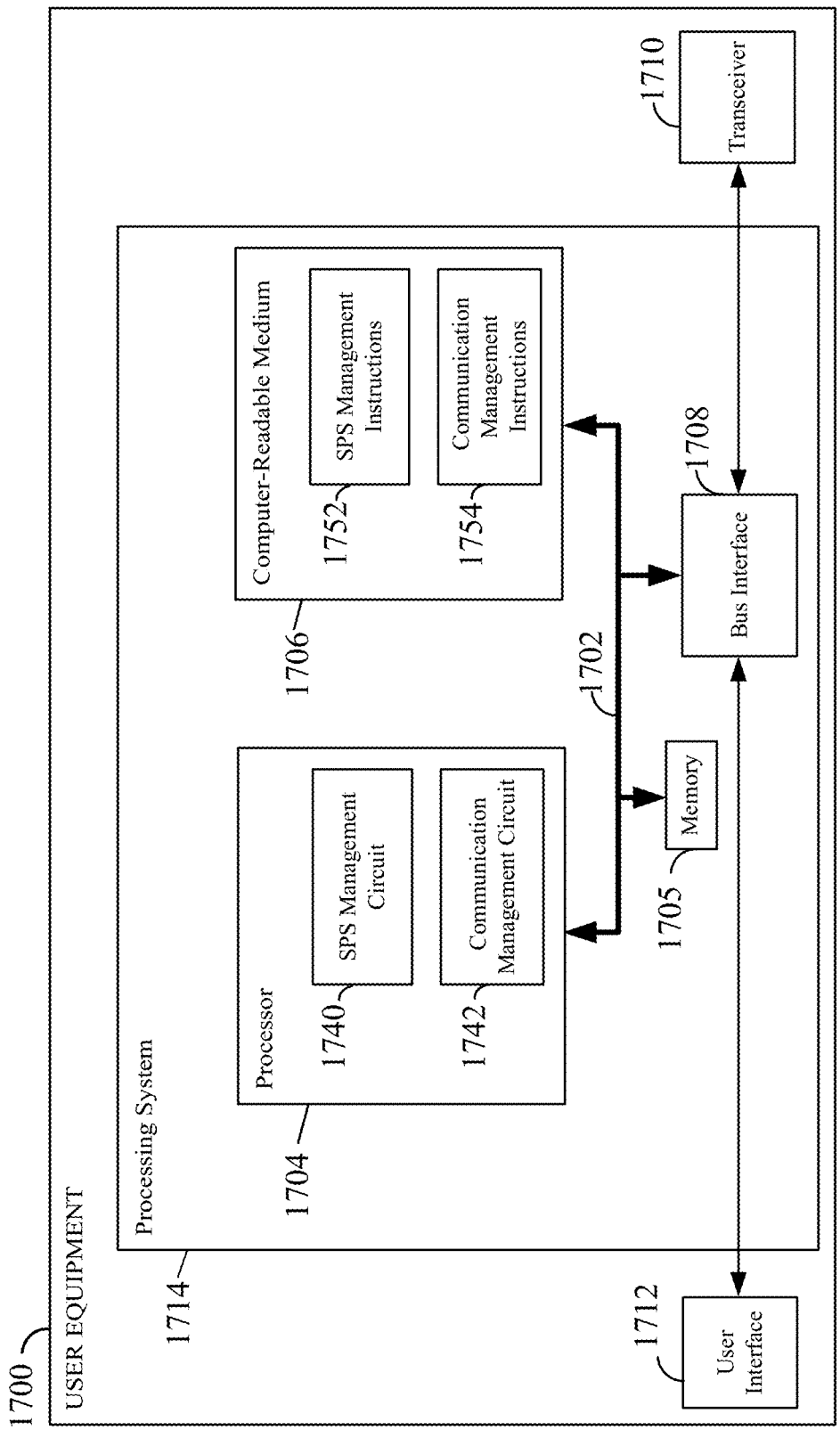
FIG. 17 is a block diagram conceptually illustrating an example of a hardware implementation for a user equipment according to some aspects of the disclosure.

FIG. 17 is a conceptual diagram illustrating an example of a hardware implementation for an exemplary UE 1700 employing a processing system 1714. In accordance with various aspects of the disclosure, an element, or any portion of an element, or any combination of elements may be implemented with a processing system 1714 that includes one or more processors 1704. For example, the UE 1700 may be a user equipment (UE) as illustrated in any one or more of FIGS. 1, 2, 3, and/or 9.

The processing system 1714 may be substantially the same as the processing system 1414 illustrated in FIG. 14, including a bus interface 1708, a bus 1702, memory 1705, a processor 1704, and a computer-readable storage medium 1706. Furthermore, the UE 1700 may include a user interface 1712 and a transceiver 1710 substantially similar to those described above in FIG. 14. That is, the processor 1704, as utilized in a UE 1700, may be used to implement any one or more of the processes described and illustrated in relation to FIGS. 18-19.

In some aspects of the disclosure, the processor 1404 may include SPS management circuit 1740 configured for various functions, including, for example, configuring to monitor a plurality of SPS occasions based on an SPS configuration. For example, the SPS management circuit 1740 may be configured to implement one or more of the functions described below in relation to FIGS. 18-19, including, e.g., blocks 1802 and 1906.

In some aspects of the disclosure, the SPS management circuit 1740 may be configured for various functions, including, for example, identifying the portion corresponding to the UE in the group common DCI based on the information. For example, the SPS management circuit 1740 may be configured to implement one or more of the functions described below in relation to FIG. 19, including, e.g., block 1912.

In some aspects of the disclosure, the processor 1404 may include communication management circuit 1742 configured for various functions, including, for example, receiving, from a base station, group common DCI that indicates cancellation of one or more SPS occasions of the plurality of SPS occasions, the group common DCI being associated with a UE group that includes one or more UEs including the UE. For example, the communication management circuit 1742 may be configured to implement one or more of the functions described below in relation to FIGS. 18-19, including, e.g., blocks 1804 and 1908.

In some aspects of the disclosure, the communication management circuit 1742 may be configured for various functions, including, for example, receiving, from the base station, a radio network temporary identifier (RNTI) configuration indicating an SPS cancellation RNTI associated with the UE group. In one aspect, the communication management circuit 1742 may provide the means for receiving the RNTI configuration. For example, the communication management circuit 1742 may be configured to implement one or more of the functions described below in relation to FIG. 19, including, e.g., block 1902.

In some aspects of the disclosure, the communication management circuit 1742 may be configured for various functions, including, for example, configuring the UE to monitor a downlink transmission with the SPS RNTI. For example, the communication management circuit 1742 may be configured to implement one or more of the functions described below in relation to FIG. 19, including, e.g., block 1904.

In some aspects of the disclosure, the communication management circuit 1742 may be configured for various functions, including, for example, receiving, from the base station, information on a portion corresponding to the UE in the group common DCI, the group common DCI having one or more portions corresponding to the one or more UEs associated with the UE group. For example, the communication management circuit 1742 may be configured to implement one or more of the functions described below in relation to FIG. 19, including, e.g., block 1910.

In some aspects of the disclosure, the communication management circuit 1742 may be configured for various functions, including, for example, refraining from monitoring the one or more SPS occasions based on the group common DCI to cancel the one or more SPS occasions. For example, the communication management circuit 1742 may be configured to implement one or more of the functions described below in relation to FIGS. 18-19, including, e.g., blocks 1806 and 1914.

In one or more examples, the computer-readable storage medium 1406 may include SPS management software/instructions 1750 configured for various functions, including, for example, configuring to monitor a plurality of SPS occasions based on an SPS configuration. For example, the SPS management software/instructions 1750 may be configured to implement one or more of the functions described below in relation to FIGS. 18-19, including, e.g., blocks 1802 and 1906.

In some aspects of the disclosure, the SPS management software/instructions 1750 may be configured for various functions, including, for example, identifying the portion corresponding to the UE in the group common DCI based on the information. For example, the SPS management software/instructions 1750 may be configured to implement one or more of the functions described below in relation to FIG. 19, including, e.g., block 1912.

In one or more examples, the computer-readable storage medium 1406 may include communication management software/instructions 1752 configured for various functions, including, for example, receiving, from a base station, group common DCI that indicates cancellation of one or more SPS occasions of the plurality of SPS occasions, the group common DCI being associated with a UE group that includes one or more UEs including the UE. For example, the communication management software/instructions 1752 may be configured to implement one or more of the functions described below in relation to FIGS. 18-19, including, e.g., blocks 1804 and 1908.

In some aspects of the disclosure, the communication management software/instructions 1752 may be configured for various functions, including, for example, receiving, from the base station, a radio network temporary identifier (RNTI) configuration indicating an SPS cancellation RNTI associated with the UE group. In one aspect, the communication management circuit 1742 may provide the means for receiving the RNTI configuration. For example, the communication management software/instructions 1752 may be configured to implement one or more of the functions described below in relation to FIG. 19, including, e.g., block 1902.

In some aspects of the disclosure, the communication management software/instructions 1752 may be configured for various functions, including, for example, configuring the UE to monitor a downlink transmission with the SPS RNTI. For example, the communication management software/instructions 1752 may be configured to implement one or more of the functions described below in relation to FIG. 19, including, e.g., block 1904.

In some aspects of the disclosure, the communication management software/instructions 1752 may be configured for various functions, including, for example, receiving, from the base station, information on a portion corresponding to the UE in the group common DCI, the group common DCI having one or more portions corresponding to the one or more UEs associated with the UE group. For example, the communication management software/instructions 1752 may be configured to implement one or more of the functions described below in relation to FIG. 19, including, e.g., block 1910.

In one or more examples, the communication management software/instructions 1752 may be configured for various functions, including, for example, refraining from monitoring the one or more SPS occasions based on the group common DCI to cancel the one or more SPS occasions. For example, the communication management software/instructions 1752 may be configured to implement one or more of the functions described below in relation to FIGS. 18-19, including, e.g., blocks 1806 and 1914.

Figure 18:
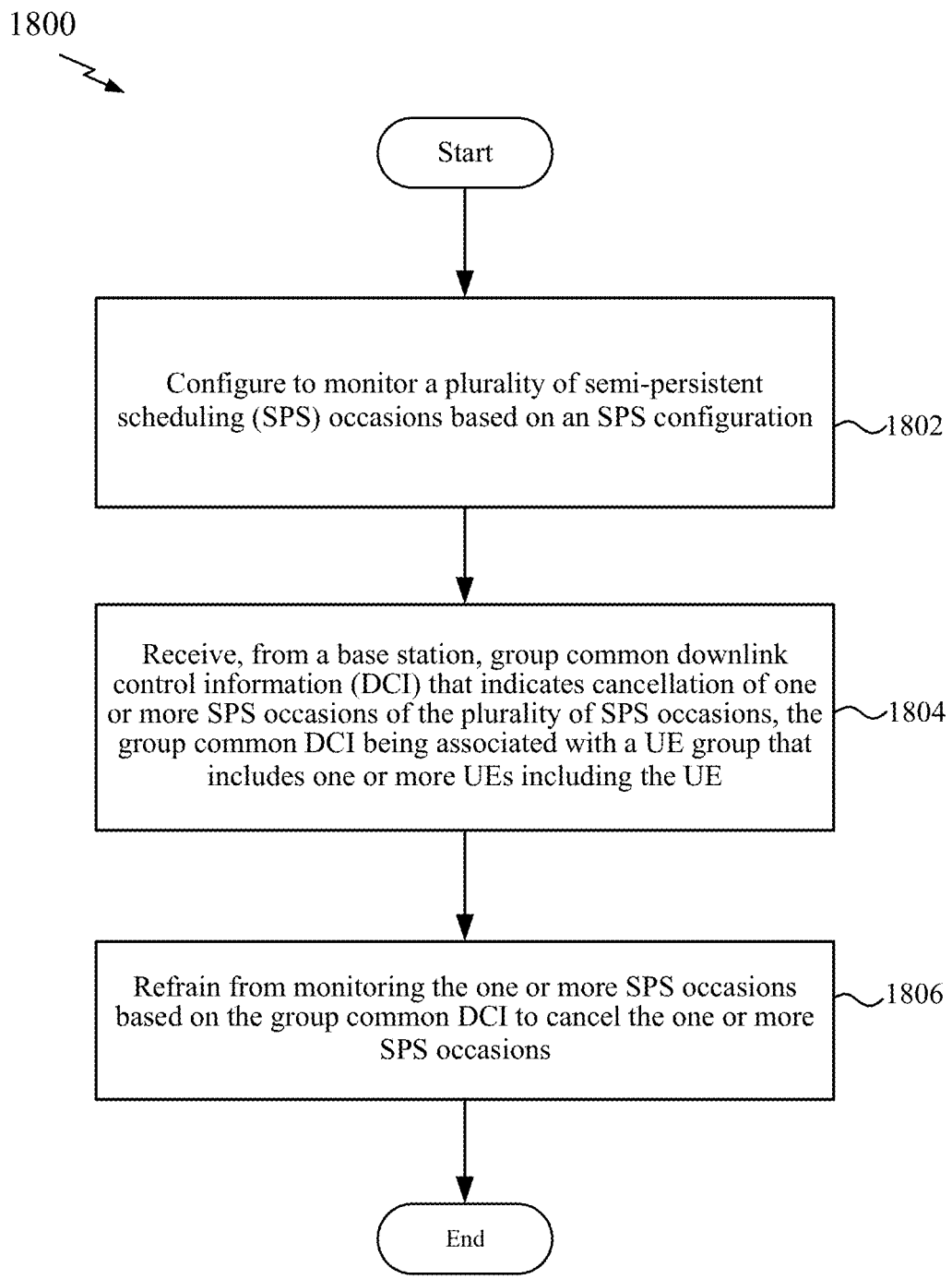
FIG. 18 is a flow chart illustrating an exemplary process for wireless communication at a user equipment according to some aspects.

FIG. 18 is a flow chart illustrating an exemplary process 1800 for wireless communication using SPS in accordance with some aspects. As described below, some or all illustrated features may be omitted in a particular implementation within the scope of the present disclosure, and some illustrated features may not be required for implementation of all embodiments. In some examples, the process 1800 may be carried out by the UE 1700 illustrated in FIG. 17. In some examples, the process 1800 may be carried out by any suitable apparatus or means for carrying out the functions or algorithm described below.

At block 1802, a UE may configure to monitor a plurality of SPS occasions based on an SPS configuration. In one aspect, the SPS management circuit 1740 may provide the means for monitoring the plurality of SPS occasions.

At block 1804, the UE may receive, from a base station, group common DCI that indicates cancellation of one or more SPS occasions of the plurality of SPS occasions, the group common DCI being associated with a UE group that includes one or more UEs including the UE. In one aspect, the communication management circuit 1742 may provide the means for receiving the group common DCI.

At block 1806, the UE may refrain from monitoring the one or more SPS occasions based on the group common DCI to cancel the one or more SPS occasions. In one aspect, the communication management circuit 1742 may refrain from monitoring the one or more SPS.

Figure 19:
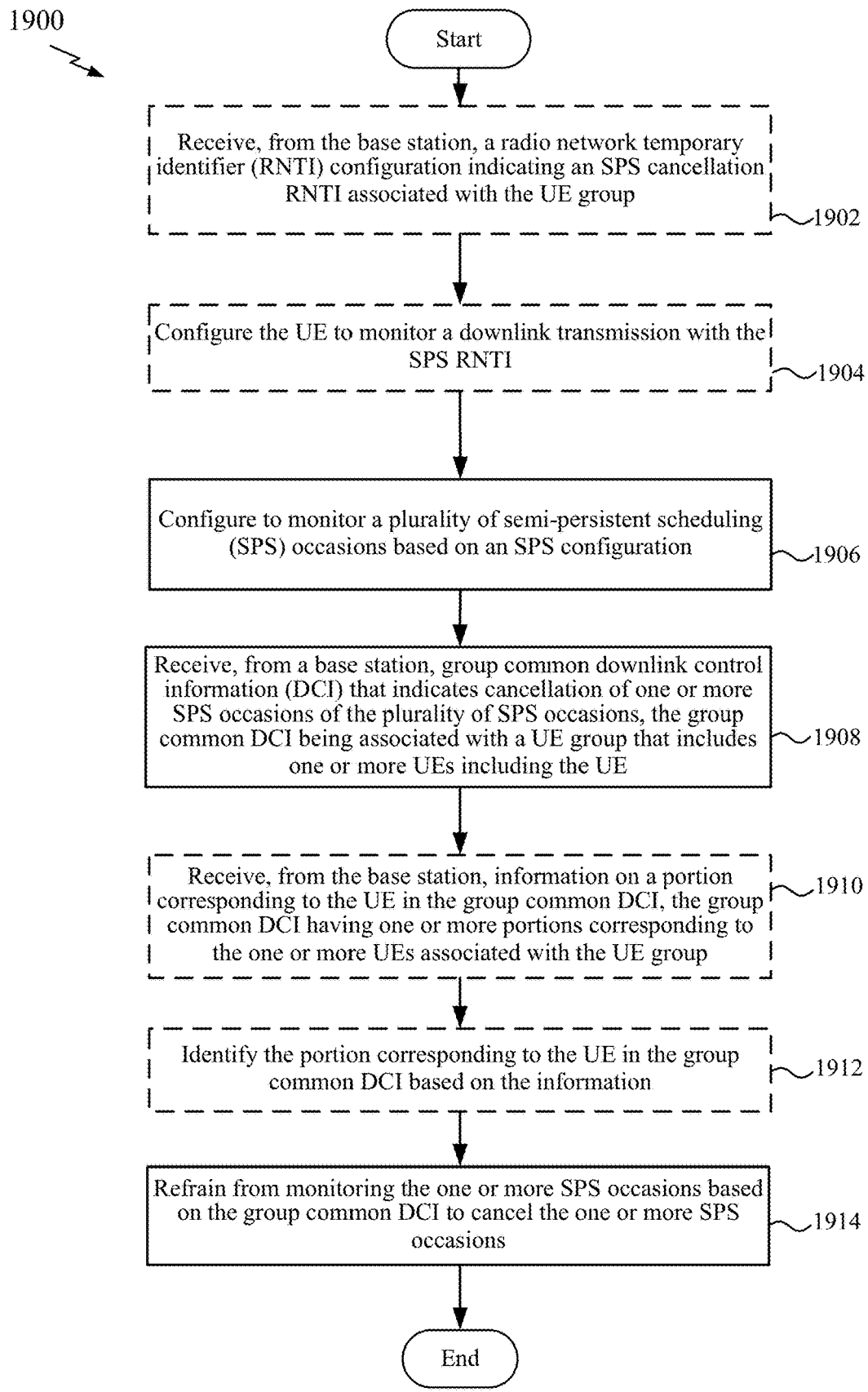
FIG. 19 is a flow chart illustrating an exemplary process for wireless communication at a user equipment according to some aspects.

FIG. 19 is a flow chart illustrating an exemplary process 1900 for wireless communication using SPS in accordance with some aspects. As described below, some or all illustrated features may be omitted in a particular implementation within the scope of the present disclosure, and some illustrated features may not be required for implementation of all embodiments. In some examples, the process 1900 may be carried out by the UE 1700 illustrated in FIG. 17. In some examples, the process 1900 may be carried out by any suitable apparatus or means for carrying out the functions or algorithm described below.

In an aspect, at block 1902, the UE may receive, from the base station, a radio network temporary identifier (RNTI) configuration indicating an SPS cancellation RNTI associated with the UE group. In one aspect, the communication management circuit 1742 may provide the means for receiving the RNTI configuration. In an aspect, the RNTI configuration is received via an RRC configuration message. In one aspect, the communication management circuit 1742 may provide the means for receiving the RNTI configuration.

In an aspect, at block 1904, the UE may configure the UE to monitor a downlink transmission with the SPS RNTI. In one aspect, the communication management circuit 1742 may provide the means for monitoring the downlink transmission.

At block 1906, a UE may configure to monitor a plurality of SPS occasions based on an SPS configuration. In one aspect, the SPS management circuit 1740 may provide the means for monitoring the plurality of SPS occasions.

At block 1908, the UE may receive, from a base station, group common DCI that indicates cancellation of one or more SPS occasions of the plurality of SPS occasions, the group common DCI being associated with a UE group that includes one or more UEs including the UE. In one aspect, the communication management circuit 1742 may provide the means for receiving the group common DCI. In an aspect, the group common DCI is received based on based on the SPS RNTI.

In an aspect, a size of the group common DCI is determined based on a number of UEs in the UE group associated with the group common DCI, a number of SPS configurations per BWP per UE in the UE group, and a number of SPS cancellation bitmap bits per SPS configuration in the UE group.

In an aspect, at block 1910, the UE may receive, from the base station, information on a portion corresponding to the UE in the group common DCI, the group common DCI having one or more portions corresponding to the one or more UEs associated with the UE group. In one aspect, the communication management circuit 1742 may provide the means for receiving the information.

In an aspect, at block 1912, the UE may identify the portion corresponding to the UE in the group common DCI based on the information. In one aspect, the SPS management circuit 1740 may provide the means for identifying the portion.

In an aspect, the SPS configuration includes a plurality of SPS configurations associated with a plurality of component carriers in one or more carrier aggregations. In an aspect, a size of the group common DCI is based on a number of the plurality of component carriers, a number of UEs in the UE group associated with the group common DCI, a number of SPS configurations per BWP per UE in the UE group, and a number of SPS cancellation bitmap bits per SPS configuration in the UE group.

In an aspect, the group common DCI comprises a plurality of component carrier group common DCI, and each component carrier group common DCI of the plurality of component carrier group common DCI is associated with a respective component carrier of the plurality of component carriers, and a size of each component carrier group common DCI of the plurality of component carrier group common DCI is based on a number of UEs in the UE group associated with the group common DCI, a number of SPS configurations per BWP per UE in the UE group, and a number of SPS cancellation bitmap bits per SPS configuration in the UE group. In an aspect, each component carrier group common DCI of the plurality of component carrier group common DCI indicates at least one of a first indication to cancel one or more SPS occasions within a component carrier associated with a respective group common DCI, or a second indication to cancel one or more SPS occasions within another component carrier associated with another group common DCI different from the respective group common DCI. In an aspect, the first indication includes an indicator for the component carrier associated with the respective one component carrier group common DCI, and the second indication includes an indicator for the another component carrier associated with the another component carrier group common DCI different from the respective component carrier group common DCI.

At block 1914, the UE may refrain from monitoring the one or more SPS occasions based on the group common DCI to cancel the one or more SPS occasions. In one aspect, the communication management circuit 1742 may refrain from monitoring the one or more SPS.

In an aspect, refraining from monitoring the one or more SPS occasions is based on the identified portion corresponding to the UE. In an aspect, the information includes one or more offset bit numbers that are respectively associated with the one or more UEs, and each of the one or more portions is identified based on a respective offset bit number, the number of SPS configurations per downlink BWP per UE, and the number of SPS cancellation bitmap bits per SPS configuration.

In an aspect, the UE is placed in the UE group based on a locations of the UE.

In one configuration, the UE 1700 for wireless communication includes means for configuring to monitor a plurality of SPS occasions based on an SPS configuration, means for receiving, from a base station, group common DCI that indicates cancellation of one or more SPS occasions of the plurality of SPS occasions, the group common DCI being associated with a UE group that includes one or more UEs including the UE, and means for refraining from monitoring the one or more SPS occasions based on the group common DCI to cancel the one or more SPS occasions. In an aspect, the UE 1700 may further include means for receiving, from the base station, a radio network temporary identifier (RNTI) configuration indicating an SPS cancellation RNTI associated with the UE group, and means for configuring the UE to monitor a downlink transmission with the SPS RNTI. In an aspect, the UE 1700 may further include means for receiving, from the base station, information on a portion corresponding to the UE in the group common DCI, the group common DCI having one or more portions corresponding to the one or more UEs associated with the UE group, and means for identifying the portion corresponding to the UE in the group common DCI based on the information. In one aspect, the aforementioned means may be the processor(s) 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1, 2, 3, and/or 9, and utilizing, for example, the processes and/or algorithms described herein in relation to FIGS. 18 and/or 19.

The following provides an overview of several aspects of the present disclosure.

Aspect 1: A method of wireless communication by a base station, comprising: associating each of a plurality of user equipment (UEs) with a respective UE group of one or more UE groups, wherein the plurality of UEs are configured with a plurality of semi-persistent scheduling (SPS) configurations by the base station, each SPS configuration of the plurality of SPS configurations configuring a plurality of respective SPS occasions; determining to cancel one or more SPS occasions associated with at least one of the plurality of SPS configurations; generating one or more group common downlink control information (DCI) for the one or more UE groups to cancel the one or more SPS occasions; and transmitting the one or more group common DCI to one or more UEs associated with the at least one of the plurality of SPS configurations.

Aspect 2: The method of aspect 1, further comprising: assigning one or more SPS cancellation radio network temporary identifiers (RNTIs) respectively to the one or more UE groups, wherein generating the one or more group common DCI is respectively based on the one or more SPS cancellation RNTI.

Aspect 3: The method of aspect 2, further comprising: transmitting, to each UE of the plurality of UEs, a respective RNTI configuration to configure a respective UE of the plurality of UEs to monitor a downlink transmission with a respective SPS RNTI of the one or more SPS RNTIs that is assigned to a UE group associated with the respective UE.

Aspect 4: The method of aspect 3, wherein the respective RNTI configuration is transmitted via a radio resource control (RRC) configuration message.

Aspect 5: The method of any of aspects 1 through 4, wherein a size of each group common DCI of the one or more group common DCI is determined based on a number of UEs in a respective UE group of the one or more UE groups that is associated with a respective group common DCI, a number of SPS configurations per downlink bandwidth part (BWP) per UE in the respective UE group, and a number of SPS cancellation bitmap bits per SPS configuration in the respective UE group.

Aspect 6: The method of aspect 5, further comprising: identifying one or more portions in each group common DCI that respectively correspond to one or more UEs of a respective UE group; and transmitting information on the one or more portions to the one or more UEs in the respective UE group.

Aspect 7: The method of aspect 6, wherein the information includes one or more offset bit numbers that are respectively associated with one or more UEs, wherein each of the one or more portions in a respective group common DCI is identified based on a respective offset bit number, the number of SPS configurations per downlink BWP per UE, and the number of SPS cancellation bitmap bits per SPS configuration.

Aspect 8: The method of any of aspects 1 through 4, wherein the plurality of SPS configurations are associated with a plurality of component carriers in one or more carrier aggregations, and wherein each of the one or more group common DCI comprises a plurality of component carrier group common DCI, and each component carrier group common DCI of the plurality of component carrier group common DCI is associated with a respective component carrier of the plurality of component carriers.

Aspect 9: The method of aspect 8, wherein a size of each component carrier group common DCI of the plurality of component carrier group common DCI is determined based on a number of the plurality of component carriers, a number of UEs in a respective UE group of the one or more UE groups that is associated with a respective group common DCI, a number of SPS configurations per downlink bandwidth part (BWP) per UE, and a number of SPS cancellation bitmap bits per SPS configuration.

Aspect 10: The method of aspect 8, wherein a size of each component carrier group common DCI of the plurality of component carrier group common DCI is determined based on a number of UEs in a respective UE group of the one or more UE groups that is associated with a respective component carrier group common DCI, a number of SPS configurations per downlink bandwidth part (BWP) per UE, and a number of SPS cancellation bitmap bits per SPS configuration.

Aspect 11: The method of aspect 10, wherein generating the one or more group common downlink control information (DCI) includes generating the plurality of component carrier group common DCI for each UE that respectively correspond to the plurality of component carriers.

Aspect 12: The method of aspect 10, wherein each component carrier group common DCI associated with the respective UE group indicates at least one of a first indication to cancel one or more SPS occasions within a component carrier associated with a respective component carrier group common DCI, or a second indication to cancel one or more SPS occasions within another component carrier associated with another group common DCI different from the respective component carrier group common DCI.

Aspect 13: The method of aspect 12, wherein the first indication includes an indicator for the component carrier associated with respective component carrier group common DCI, and wherein the second indication includes an indicator for the another component carrier associated with the another group common DCI different from the respective component carrier group common DCI.

Aspect 14: The method of any of aspects 1 through 13, wherein each of the plurality of UEs is associated with the respective UE group of one or more UE groups based on a locations of a respective UE of the plurality of UEs.

Aspect 15: A base station comprising: a transceiver configured to communicate with a radio access network, a memory, and at least one processor communicatively coupled to the transceiver and the memory, wherein the at least one processor and the memory are configured to perform any one of aspects 1 through 14.

Aspect 16: A base station configured for wireless communication comprising at least one means for performing any one of aspects 1 through 14.

Aspect 17: A non-transitory processor-readable storage medium having instructions for a base station thereon, wherein the instructions, when executed by a processing circuit, cause the processing circuit to perform any one of aspects 1 through 14.

Aspect 18: A method of wireless communication by a user equipment (UE), comprising: configuring to monitor a plurality of semi-persistent scheduling (SPS) occasions based on an SPS configuration; receiving, from a base station, group common downlink control information (DCI) that indicates cancellation of one or more SPS occasions of the plurality of SPS occasions, the group common DCI being associated with a UE group that includes one or more UEs including the UE; and refraining from monitoring the one or more SPS occasions based on the group common DCI to cancel the one or more SPS occasions.

Aspect 19: The method of aspect 18, further comprising: receiving, from the base station, a radio network temporary identifier (RNTI) configuration indicating an SPS cancellation RNTI associated with the UE group; and configuring the UE to monitor a downlink transmission with the SPS RNTI, wherein the group common DCI is received based on based on the SPS RNTI.

Aspect 20: The method of aspect 19, wherein the RNTI configuration is received via a radio resource control (RRC) configuration message.

Aspect 21: The method of any of aspects 18 through 20, wherein a size of the group common DCI is determined based on a number of UEs in the UE group associated with the group common DCI, a number of SPS configurations per downlink bandwidth part (BWP) per UE in the UE group, and a number of SPS cancellation bitmap bits per SPS configuration in the UE group.

Aspect 22: The method of aspect 21, further comprising: receiving, from the base station, information on a portion corresponding to the UE in the group common DCI, the group common DCI having one or more portions corresponding to the one or more UEs associated with the UE group, identifying the portion corresponding to the UE in the group common DCI based on the information, wherein refraining from monitoring the one or more SPS occasions is based on the identified portion corresponding to the UE.

Aspect 23: The method of aspect 22, wherein the information includes one or more offset bit numbers that are respectively associated with the one or more UEs, and wherein each of the one or more portions is identified based on a respective offset bit number, the number of SPS configurations per downlink BWP per UE, and the number of SPS cancellation bitmap bits per SPS configuration.

Aspect 24: The method of any of aspects 18 through 20, wherein the SPS configuration includes a plurality of SPS configurations associated with a plurality of component carriers in one or more carrier aggregations.

Aspect 25: The method of aspect 24, wherein a size of the group common DCI is based on a number of the plurality of component carriers, a number of UEs in the UE group associated with the group common DCI, a number of SPS configurations per downlink bandwidth part (BWP) per UE in the UE group, and a number of SPS cancellation bitmap bits per SPS configuration in the UE group.

Aspect 26: The method of aspect 24, wherein the group common DCI comprises a plurality of component carrier group common DCI, and each component carrier group common DCI of the plurality of component carrier group common DCI is associated with a respective component carrier of the plurality of component carriers, and wherein a size of each component carrier group common DCI of the plurality of component carrier group common DCI is based on a number of UEs in the UE group associated with the group common DCI, a number of SPS configurations per downlink bandwidth part (BWP) per UE in the UE group, and a number of SPS cancellation bitmap bits per SPS configuration in the UE group.

Aspect 27: The method of aspect 26, wherein each component carrier group common DCI of the plurality of component carrier group common DCI indicates at least one of a first indication to cancel one or more SPS occasions within a component carrier associated with a respective group common DCI, or a second indication to cancel one or more SPS occasions within another component carrier associated with another group common DCI different from the respective group common DCI.

Aspect 28: The method of aspect 27, wherein the first indication includes an indicator for the component carrier associated with the respective one component carrier group common DCI, and wherein the second indication includes an indicator for the another component carrier associated with the another component carrier group common DCI different from the respective component carrier group common DCI.

Aspect 29: The method of any of aspects 18 through 28, wherein the UE is placed in the UE group based on a locations of the UE.

Aspect 30: A UE comprising: a transceiver configured to communicate with a radio access network, a memory, and at least one processor communicatively coupled to the transceiver and the memory, wherein the at least one processor and the memory are configured to perform any one of aspects 15 through 29.

Aspect 31: A UE configured for wireless communication comprising at least one means for performing any one of aspects 15 through 29.

Aspect 32: A non-transitory processor-readable storage medium having instructions for a UE thereon, wherein the instructions, when executed by a processing circuit, cause the processing circuit to perform any one of aspects 15 through 29.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within wireless communication systems employing IEEE 802.11 (Wi-Fi®), IEEE 802.16 (WiMAX®). IEEE 802.20, Ultra-Wideband (UWB), Bluetooth® and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A network entity, comprising:
    at least one processor;
    a transceiver communicatively coupled to the at least one processor; and
    at least one memory comprising instructions,
    wherein the at least one processor is configured to execute the instructions to cause the network entity to:
        associate each of a plurality of user equipment (UEs) with a respective UE group of one or more UE groups, wherein the plurality of UEs are configured with a plurality of semi-persistent scheduling (SPS) configurations, each SPS configuration of the plurality of SPS configurations configuring a plurality of respective SPS occasions;
        determine to cancel a defined quantity of one or more SPS occasions associated with at least one of the plurality of SPS configurations;
        generate one or more group common downlink control information (DCI) associated with the one or more UE groups, the one or more group common DCI indicating cancellation of the defined quantity of the one or more SPS occasions; and
        transmit, via the transceiver, the one or more group common DCI to one or more UEs in the one or more UE groups, the one or more UEs being associated with the at least one of the plurality of SPS configurations,
        wherein a size of each group common DCI of the one or more group common DCI is based on at least one of a quantity of UEs in a respective UE group of the one or more UE groups that is associated with a respective group common DCI, a quantity of SPS configurations per downlink bandwidth part (BWP) per UE in the respective UE group, or a quantity of SPS cancellation bitmap bits per SPS configuration in the respective UE group.

2. The network entity of claim 1, wherein the at least one processor is further configured to cause the network entity to:
    assign one or more SPS cancellation radio network temporary identifiers (RNTIs) respectively to the one or more UE groups,
    wherein the at least one processor is configured to cause the network entity to generate the one or more group common DCI is respectively based on the one or more SPS cancellation RNTI.

3. The network entity of claim 2, wherein the at least one processor is further configured to cause the network entity to:
    transmit, via the transceiver, to each UE of the plurality of UEs, a respective RNTI configuration to configure a respective UE of the plurality of UEs to monitor a downlink transmission with a respective SPS RNTI of the one or more SPS RNTIs that is assigned to a UE group associated with the respective UE.

4. The network entity of claim 1, wherein the at least one processor is further configured to cause the network entity to:
    identify one or more portions in each group common DCI that respectively correspond to one or more UEs of a respective UE group; and
    transmit, via the transceiver, information on the one or more portions to the one or more UEs in the respective UE group.

5. The network entity of claim 4, wherein the information includes one or more offset bit numbers that are respectively associated with one or more UEs,
    wherein each of the one or more portions in a respective group common DCI is identified based on at least one of a respective offset bit number, the quantity of SPS configurations per downlink BWP per UE, or the quantity of SPS cancellation bitmap bits per SPS configuration.

6. The network entity of claim 1, wherein the plurality of SPS configurations are associated with a plurality of component carriers in one or more carrier aggregations, and
    wherein each of the one or more group common DCI comprises a plurality of component carrier group common DCI, and each component carrier group common DCI of the plurality of component carrier group common DCI is associated with a respective component carrier of the plurality of component carriers.

7. The network entity of claim 6, wherein a size of each component carrier group common DCI of the plurality of component carrier group common DCI is based on at least one of a quantity of the plurality of component carriers, a quantity of UEs in a respective UE group of the one or more UE groups that is associated with a respective group common DCI, a quantity of SPS configurations per downlink bandwidth part (BWP) per UE, or a quantity of SPS cancellation bitmap bits per SPS configuration.

8. The network entity of claim 6, wherein a size of each component carrier group common DCI of the plurality of component carrier group common DCI is based on at least one of a quantity of UEs in a respective UE group of the one or more UE groups that is associated with a respective component carrier group common DCI, a quantity of SPS configurations per downlink bandwidth part (BWP) per UE, or a quantity of SPS cancellation bitmap bits per SPS configuration.

9. The network entity of claim 8, wherein the at least one processor configured to generate the one or more group common downlink control information (DCI) is configured to generate the plurality of component carrier group common DCI for each UE that respectively correspond to the plurality of component carriers.

10. The network entity of claim 8, wherein each component carrier group common DCI associated with the respective UE group indicates at least one of
    a first indication to cancel one or more SPS occasions within a component carrier associated with a respective component carrier group common DCI, or
    a second indication to cancel one or more SPS occasions within another component carrier associated with another group common DCI different from the respective component carrier group common DCI.

11. The network entity of claim 10, wherein the first indication includes an indicator for the component carrier associated with respective component carrier group common DCI, and wherein the second indication includes an indicator for the another component carrier associated with the another group common DCI different from the respective component carrier group common DCI.

12. The network entity of claim 1, wherein each of the plurality of UEs is associated with the respective UE group of one or more UE groups based on a locations location of a respective UE of the plurality of UEs.

13. A method of wireless communication by a network entity, comprising:

associating each of a plurality of user equipment (UEs) with a respective UE group of one or more UE groups, wherein the plurality of UEs are configured with a plurality of semi-persistent scheduling (SPS) configurations, each SPS configuration of the plurality of SPS configurations configuring a plurality of respective SPS occasions;

determining to cancel a defined quantity of one or more SPS occasions associated with at least one of the plurality of SPS configurations;

generating one or more group common downlink control information (DCI) associated with the one or more UE groups, the one or more group common DCI indicating cancellation of the defined quantity of the one or more SPS occasions; and transmitting the one or more group common DCI to one or more UEs in the one or more UE groups, the one or more UEs being associated with the at least one of the plurality of SPS configurations, wherein a size of each group common DCI of the one or more group common DCI is based on at least one of a quantity of UEs in a respective UE group of the one or more UE groups that is associated with a respective group common DCI, a quantity of SPS configurations per downlink bandwidth part (BWP) per UE in the respective UE group, or a quantity of SPS cancellation bitmap bits per SPS configuration in the respective UE group.

14. The method of claim 13, further comprising:

assigning one or more SPS cancellation radio network temporary identifiers (RNTIs) respectively to the one or more UE groups, wherein generating the one or more group common DCI is respectively based on the one or more SPS cancellation RNTI.

15. The method of claim 14, further comprising:

transmitting, to each UE of the plurality of UEs, a respective RNTI configuration to configure a respective UE of the plurality of UEs to monitor a downlink transmission with a respective SPS RNTI of the one or more SPS RNTIs that is assigned to a UE group associated with the respective UE.

16. A user equipment (UE), comprising:

at least one processor;

a transceiver communicatively coupled to the at least one processor; and at least one memory comprising instructions, wherein the at least one processor is configured to execute the instructions to cause the UE to:

configure to monitor a plurality of semi-persistent scheduling (SPS) occasions based on an SPS configuration;

receive, via the transceiver and from a network entity, group common downlink control information (DCI) that indicates cancellation of a defined quantity of one or more SPS occasions of the plurality of SPS occasions, the group common DCI being associated with a UE group that includes one or more UEs including the UE; and refrain from monitoring the defined quantity of one or more SPS occasions based on the group common DCI, wherein a size of the group common DCI is based on at least one of a quantity of UEs in the UE group associated with the group common DCI, a quantity of SPS configurations per downlink bandwidth part (BWP) per UE in the UE group, or a quantity of SPS cancellation bitmap bits per SPS configuration in the UE group.

17. The UE of claim 16, wherein the at least one processor is further configured to cause the UE to:

receive, via the transceiver and from the network entity, an SPS cancellation radio network temporary identifier (RNTI) associated with the UE group; and configure the UE to monitor the group common DCI based on the SPS RNTI.

18. The UE of claim 17, wherein the at least one processor is further configured to cause the UE to:

receive, via the transceiver and from the network entity, an RNTI configuration; and configure the UE based on the RNTI configuration to monitor a downlink transmission with the SPS RNTI associated with the UE group.

19. The UE of claim 16, wherein the at least one processor is further configured to cause the UE to:

receive, via the transceiver and from the network entity, information on a portion corresponding to the UE in the group common DCI, the group common DCI having one or more portions corresponding to the one or more UEs associated with the UE group, wherein refraining from monitoring the defined quantity of one or more SPS occasions is based on the portion corresponding to the UE.

20. The UE of claim 19, wherein the information includes one or more offset bit numbers that are respectively associated with the one or more UEs, and wherein each of the one or more portions is identified based on at least one of a respective offset bit number, the quantity of SPS configurations per downlink BWP per UE, or the quantity of SPS cancellation bitmap bits per SPS configuration.

21. The UE of claim 16, wherein the SPS configuration includes a plurality of SPS configurations associated with a plurality of component carriers in one or more carrier aggregations.

22. The UE of claim 21, wherein a size of the group common DCI is based on a number quantity of the plurality of component carriers, a quantity of UEs in the UE group associated with the group common DCI, a quantity of SPS configurations per downlink bandwidth part (BWP) per UE in the UE group, or a quantity of SPS cancellation bitmap bits per SPS configuration in the UE group.

23. The UE of claim 21, wherein the group common DCI comprises a plurality of component carrier group common DCI, and each component carrier group common DCI of the plurality of component carrier group common DCI is associated with a respective component carrier of the plurality of component carriers, and wherein a size of each component carrier group common DCI of the plurality of component carrier group common DCI is based on at least one of a quantity of UEs in the UE group associated with the group common DCI, a quantity of SPS configurations per downlink bandwidth part (BWP) per UE in the UE group, or a quantity of SPS cancellation bitmap bits per SPS configuration in the UE group.

24. The UE of claim 23, wherein each component carrier group common DCI of the plurality of component carrier group common DCI indicates at least one of:
  a first indication to cancel one or more SPS occasions within a component carrier associated with a respective group common DCI, or
  a second indication to cancel one or more SPS occasions within another component carrier associated with another group common DCI different from the respective group common DCI.

25. The UE of claim 24, wherein the first indication includes an indicator for the component carrier associated with the respective one component carrier group common DCI, and
  wherein the second indication includes an indicator for the another component carrier associated with the another component carrier group common DCI different from the respective component carrier group common DCI.

26. The UE of claim 16, wherein the UE is in the UE group based on a location of the UE.

27. A method of wireless communication at a user equipment (UE), comprising:
  configuring to monitor a plurality of semi-persistent scheduling (SPS) occasions based on an SPS configuration;
  receiving, from a network entity, group common downlink control information (DCI) that indicates cancellation of a defined quantity of one or more SPS occasions of the plurality of SPS occasions, the group common DCI being associated with a UE group that includes one or more UEs including the UE; and
  refraining from monitoring the one or more SPS occasions based on the group common DCI to cancel the one or more SPS occasions,
  wherein a size of the group common DCI is based on at least one of a quantity of UEs in the UE group associated with the group common DCI, a quantity of SPS configurations per downlink bandwidth part (BWP) per UE in the UE group, or a quantity of SPS cancellation bitmap bits per SPS configuration in the UE group.

28. The method of claim 27, further comprising:
  receiving, from the network entity, information on a portion corresponding to the UE in the group common DCI, the group common DCI having one or more portions corresponding to the one or more UEs associated with the UE group,
  wherein refraining from monitoring the defined quantity of one or more SPS occasions is based on the portion corresponding to the UE.

29. The method of claim 28, wherein the information includes one or more offset bit numbers that are respectively associated with the one or more UEs, and
  wherein each of the one or more portions is identified based on at least one of a respective offset bit number, the quantity of SPS configurations per downlink BWP per UE, or the quantity of SPS cancellation bitmap bits per SPS configuration.

30. The method of claim 27, wherein the SPS configuration includes a plurality of SPS configurations associated with a plurality of component carriers in one or more carrier aggregations.

* * * * *